(12) United States Patent
Barbosa

(10) Patent No.: US 11,060,572 B2
(45) Date of Patent: Jul. 13, 2021

(54) ELECTRIC ACTUATOR ASSEMBLY FOR A DRUM BRAKE ASSEMBLY

(71) Applicant: ZF Active Safety US Inc., Livonia, MI (US)

(72) Inventor: Manuel Barbosa, Livonia, MI (US)

(73) Assignee: ZF Active Safety US Inc., Livonia, MI (US)

( * ) Notice: Subject to any disclaimer, the term of this patent is extended or adjusted under 35 U.S.C. 154(b) by 56 days.

(21) Appl. No.: 16/483,868

(22) PCT Filed: Feb. 7, 2018

(86) PCT No.: PCT/US2018/017168
§ 371 (c)(1),
(2) Date: Aug. 6, 2019

(87) PCT Pub. No.: WO2018/148245
PCT Pub. Date: Aug. 16, 2018

(65) Prior Publication Data
US 2020/0018365 A1 Jan. 16, 2020

Related U.S. Application Data

(60) Provisional application No. 62/455,816, filed on Feb. 7, 2017.

(51) Int. Cl.
*F16D 65/14* (2006.01)
*F16D 51/22* (2006.01)
(Continued)

(52) U.S. Cl.
CPC .............. *F16D 51/22* (2013.01); *B60T 1/067* (2013.01); *B60T 13/74* (2013.01); *F16D 55/224* (2013.01);
(Continued)

(58) Field of Classification Search
CPC .......... F16D 65/14; F16D 65/18; F16D 65/22; F16D 51/22; F16D 55/224; B60T 13/588
(Continued)

(56) References Cited

U.S. PATENT DOCUMENTS 3,993,173 A * 11/1976 Hoffman ............... F16D 55/226
188/138
6,405,838 B1   6/2002 Shaw
(Continued)

FOREIGN PATENT DOCUMENTS

JP   2002061688 A   2/2002
KR   20100043694 A   4/2010

OTHER PUBLICATIONS

PCT International Search Report and Written Opinion, Application No. PCT/US2018/017168, dated May 18, 2018.

*Primary Examiner* — Christopher P Schwartz
(74) *Attorney, Agent, or Firm* — Robert James Harwood

(57) ABSTRACT

A drum brake assembly includes a brake drum, a brake shoe and lining assembly operably displaceable to contact the brake drum, and an electric actuator assembly. The electric actuator assembly has an electric motor with an output shaft, a gear reduction driven by the output shaft, a linear translation assembly having a gear nut driven by the gear reduction, and a connection portion of the linear translation assembly. The output shaft drives the gear reduction through a suitable gear type that can convert a rotation torque of the output shaft to the gear reduction at a right angle. The linear translation assembly linearly translates when the gear nut is driven. As a result of the linear translation, the connection portion actuates the brake shoe and lining assembly to contact the brake drum.

35 Claims, 23 Drawing Sheets

(51) Int. Cl.
  *B60T 1/06* (2006.01)
  *B60T 13/74* (2006.01)
  *F16D 55/224* (2006.01)
  *F16D 121/02* (2012.01)
  *F16D 121/18* (2012.01)
  *F16D 125/48* (2012.01)
  *F16D 125/52* (2012.01)

(52) U.S. Cl.
  CPC ...... *F16D 2121/02* (2013.01); *F16D 2121/18* (2013.01); *F16D 2125/48* (2013.01); *F16D 2125/52* (2013.01); *F16D 2250/0084* (2013.01)

(58) Field of Classification Search
  USPC .................................. 188/156, 158, 325–327
  See application file for complete search history.

(56) References Cited

U.S. PATENT DOCUMENTS

| | | | | |
|---|---|---|---|---|
| 6,497,310 B2* | 12/2002 | Murayama | .............. | F16D 51/00 188/325 |
| 6,814,190 B1* | 11/2004 | Olschewski | .......... | F16H 63/062 188/72.8 |
| 8,047,339 B2* | 11/2011 | Park | ........................ | F16D 65/18 188/72.8 |
| 8,292,050 B2 | 10/2012 | Kim | | |
| 8,720,653 B2* | 5/2014 | Han | ...................... | B60T 13/741 188/156 |
| 9,188,182 B2* | 11/2015 | Park | ........................ | F16D 65/18 |
| 9,476,469 B2* | 10/2016 | Gutelius | ................. | F16D 65/14 |
| 2006/0278477 A1* | 12/2006 | Balz | ........................ | F16D 51/48 188/156 |
| 2010/0101900 A1* | 4/2010 | Usui | ....................... | F16D 65/18 188/156 |
| 2011/0247904 A1* | 10/2011 | Yamasaki | ............... | F16D 65/18 188/72.1 |
| 2012/0205209 A1* | 8/2012 | Tsuzuku | ................. | F16D 65/563 188/325 |
| 2015/0041261 A1* | 2/2015 | Masuda | .................. | F16D 65/18 188/163 |
| 2015/0176664 A1* | 6/2015 | Maehara | ................. | F16D 51/28 188/327 |
| 2015/0345580 A1* | 12/2015 | Jung | ....................... | B60T 13/02 701/70 |
| 2017/0227078 A1* | 8/2017 | Oshio | .................... | F16D 66/00 |
| 2018/0058525 A1* | 3/2018 | Kasper | .................. | F16D 51/28 |
| 2018/0065608 A1* | 3/2018 | Persson | ................. | F16D 55/226 |

\* cited by examiner

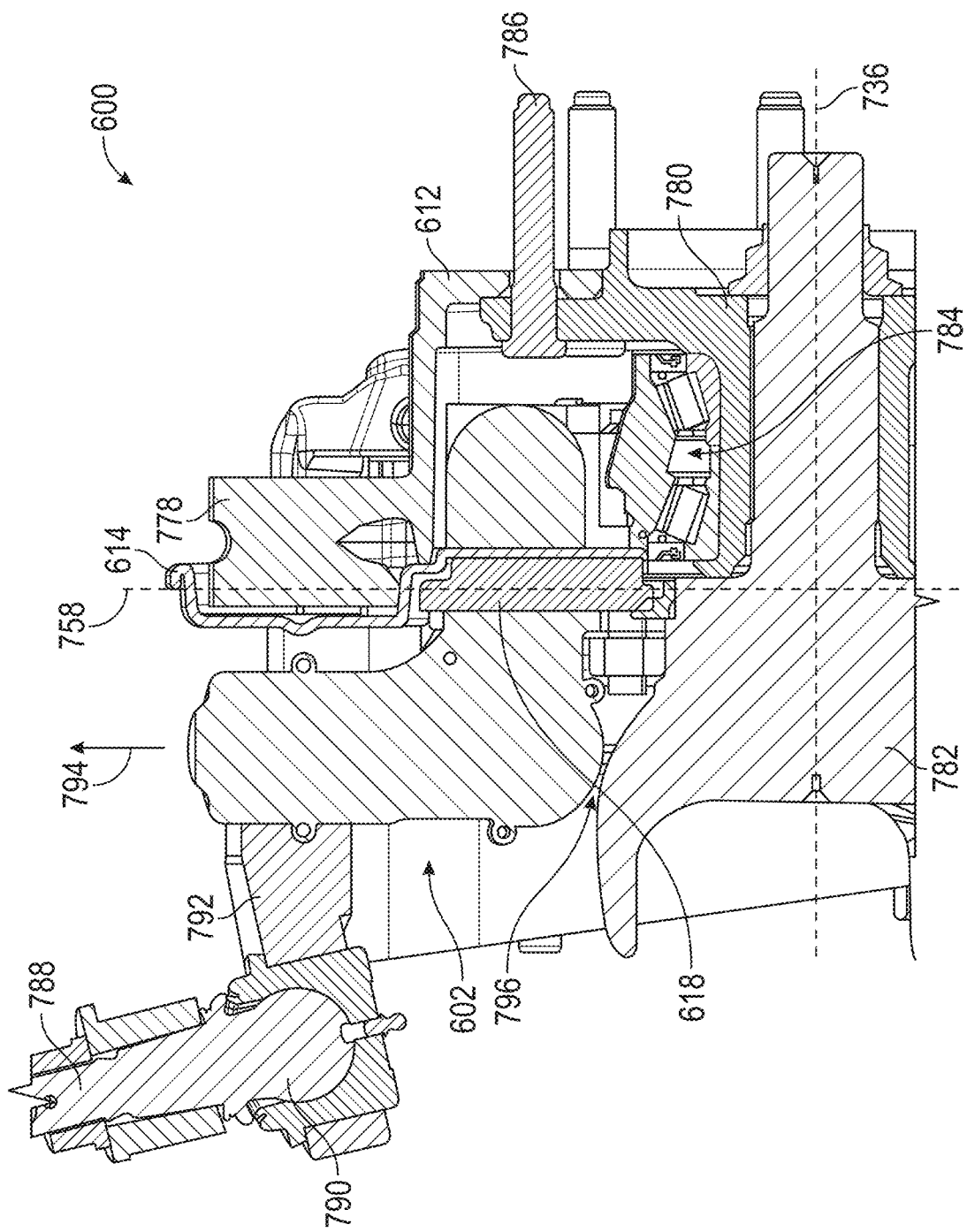

ELECTRIC ACTUATOR ASSEMBLY FOR A DRUM BRAKE ASSEMBLY

CROSS REFERENCE TO RELATED APPLICATIONS

This application claims priority to, and the benefit of, International Application No. PCT/US18/017168, filed Feb. 7, 2018, which in turn claims priority to, and the benefit of, U.S. Provisional Application Ser. No. 62/455,816, filed Feb. 7, 2017, the full disclosures of both of which are incorporated herein by reference in entirety.

BACKGROUND OF INVENTION

This invention relates in general to drum brake assemblies for automotive vehicles and in particular to an electric actuator assembly for use with such a drum brake assembly.

Automotive vehicles are typically equipped with a brake system for slowing or stopping movement of the vehicle in a controlled manner. A typical brake system for an automobile or light truck includes a disc brake assembly for each of the front wheels and a drum brake assembly for each of the rear wheels. The brake assemblies are actuated by hydraulic or pneumatic pressure generated when an operator of the vehicle depresses a brake pedal. The brake assemblies may be used to provide service braking, emergency braking, and/or a parking brake function. The structures and operation of these disc brake assemblies and drum brake assemblies are well known in the art.

The typical drum brake assembly includes a brake drum that rotates with the vehicle wheel and a pair of brake shoe and lining assemblies that are rotationally fixed. The drum brake assembly operates by the brake shoe and lining assemblies being selectively actuated between braking and non-braking positions. In the braking position, the brake shoe and lining assemblies contact and press against the brake drum to slow or otherwise stop rotation of the wheel to provide braking for the vehicle. In the non-braking position, the brake shoe and lining assemblies do not contact the brake drum and allow the wheel to rotate freely. For the drum brake assembly to provide emergency braking, or to provide the parking brake function, an electric actuator assembly may be used to actuate the brake shoe and lining assemblies from the non-braking position to the braking position and/or to support or otherwise maintain the brake shoe and lining assemblies in the braking position.

The electric actuator assembly actuates the brake shoe and lining assemblies using an electric motor that drives a gear nut to extend a spindle. The extended spindle presses the brake shoe and lining assemblies against the brake drum—i.e., the brake shoe and lining assemblies are in the braking position. To transfer the rotational torque of the electric motor to the gear nut, an output of the electric motor may be a worm gear that directly contacts and drives the gear nut or the output may drive one or more gears on axes parallel to the output of the electric motor that in turn drive the gear nut.

However, packaging specifications for the vehicle typically require a smaller electric motor while braking force specifications require a larger electric motor. When the worm gear is used, inefficiencies of the worm gear also require a larger electric motor. Furthermore, known electric actuator assemblies are specific to left hand or right hand drum brake assemblies—i.e., a single electric actuator assembly is not interchangeable between left hand and right hand drum brake assemblies. Thus, it would be desirable to have an electric actuator assembly for drum brake assemblies that is more efficient to allow use of a smaller, less expensive electric motor and is interchangeable between left hand and right hand drum brake assemblies.

SUMMARY OF INVENTION

This invention relates to an electric actuator assembly for use with a drum brake assembly.

According to one embodiment, an electric actuator assembly for a drum brake assembly may comprise, individually and/or in combination, one or more of the following features: an electric motor with an output shaft, a gear reduction driven by the output shaft, a linear translation assembly having a gear nut driven by the gear reduction, and a connection portion of the linear translation assembly. The output shaft drives the gear reduction through a suitable gear type that can convert a rotation torque of the output shaft to the gear reduction at a right angle. The linear translation assembly linearly translates when the gear nut is driven. The connection portion is adapted to actuate a brake shoe and lining assembly of the drum brake assembly.

According to this embodiment, the output shaft extends along a first axis and the linear translation assembly translates along a second axis. The first axis and the second axis are perpendicular.

According to this embodiment, the gear reduction is rotationally supported by the at least one pin and the output shaft extends along an axis. The at least one pin and the axis are perpendicular.

According to this embodiment, the gear reduction is rotationally supported by the at least one pin and the linear translation assembly translates along an axis. The at least one pin and the axis are parallel.

According to this embodiment, the gear reduction may further comprise spur or helical gears.

According to this embodiment, the suitable gear type is a preferably a "high efficiency" gear type and may include a bevel gear, a spiral bevel gear, a crown gear, a hypoid gear, and other type of gear with intersecting shafts, or a type of gear with non-intersecting shafts other than a worm gear.

According to this embodiment, the linear translation assembly may further comprise a rotationally fixed spindle, wherein the gear nut and spindle linearly translates in opposite directions when the gear nut is driven.

According to this embodiment, the electric actuator assembly may further comprise an additional connection portion of the linear translation assembly that is adapted to actuate an additional brake shoe and lining assembly of the drum brake assembly.

According to this embodiment, the first connection portion linearly translates in a first direction and the second connection portion linearly translates in a second direction that is opposite the first direction.

According to this embodiment, the electric actuator assembly is interchangeable between a left hand drum brake assembly and a right hand drum brake assembly.

According to this embodiment, a first diameter of the gear reduction is less than or equal to a second diameter of the gear nut.

According to this embodiment, the electric actuator assembly is not configured to function as a shoe anchor for the brake shoe and lining assembly of the drum brake assembly.

According to this embodiment, the electric actuator assembly and the shoe anchor are configured as separate and distinct components.

According to this embodiment, the electric actuator assembly is configured to be installed in a cradle portion of a drum-in-hat adapter by movement along an insertion axis of the drum-in-hat adapter that is perpendicular to an axle axis of the drum-in-hat adapter.

According to this embodiment, the electric actuator assembly may further comprise a drive socket configured for an external drive to actuate the brake shoe and lining assembly of the drum brake assembly.

According to this embodiment, the electric actuator assembly may further comprise a rotationally fixed spindle of the linear translation assembly, a spring pack between the gear nut and the connection portion, a bearing between the spindle and the spring pack, and a boot at the connection portion. The gear nut and the spindle linearly translate in opposite directions when the gear nut is driven. The spring pack is configured to take up slack in the linear translation assembly.

According to this embodiment, the spindle, spring pack, bearing, and boot are directly supported by a housing of the electric actuator assembly and not configured to be directly supported by a drum-in-hat adapter.

According to another embodiment, a drum brake assembly may comprise, individually and/or in combination, one or more of the following features: a brake drum, a brake shoe and lining assembly operably displaceable to contact the brake drum, and an electric actuator assembly. The electric actuator assembly has an electric motor with an output shaft, a gear reduction driven by the output shaft, a linear translation assembly having a gear nut driven by the gear reduction, and a connection portion of the linear translation assembly. The output shaft drives the gear reduction through a suitable gear type that can convert a rotation torque of the output shaft to the gear reduction at a right angle. The linear translation assembly linearly translates when the gear nut is driven. The connection portion actuates the brake shoe and lining assembly to contact the brake drum.

According to this embodiment, the gear reduction may further comprise spur or helical gears.

According to this embodiment, the drum brake assembly may further comprise an additional brake shoe and lining assembly operably displaceable to contact the brake drum and an additional connection portion of the linear translation assembly that actuates the additional brake shoe and lining assembly to contact the brake drum.

According to this embodiment, the drum brake assembly may further comprise a mounting flange of the electric actuator assembly, a drum-in-hat adapter to which the mounting flange is mounted, an opening through the drum-in-hat adapter, and a pocket portion of the opening. The electric actuator assembly is moved vertically in a first direction such that the linear translation assembly enters the opening and the connection portion vertically aligns with the pocket portion, next moved horizontally in a second direction such that the connection portion passes through the pocket, then moved vertically in a third direction, opposite the first direction, and lastly moved horizontally in the second direction until the linear translation assembly passes through the opening and the mounting flange is positioned for mounting to the drum-in-hat adapter.

According to this embodiment, the electric actuator assembly is not configured to function as a shoe anchor for the brake shoe and lining assembly of the drum brake assembly.

According to this embodiment, the electric actuator assembly and the shoe anchor are configured as separate and distinct components.

According to this embodiment, the drum brake assembly may further comprise a mounting flange of the electric actuator assembly, a drum-in-hat adapter to which the mounting flange is mounted, and a cradle portion of the drum-in-hat adapter. The electric actuator assembly is installed in the cradle portion by movement along an insertion axis of the drum-in-hat adapter that is perpendicular to an axle axis of the drum-in-hat adapter.

According to this embodiment, the drum brake assembly may further comprise a drive socket of the electric actuator assembly. The drive socket is configured for an external drive to actuate the brake shoe and lining assembly of the brake assembly.

According to this embodiment, the electric actuator assembly may further comprise a rotationally fixed spindle of the linear translation assembly, a spring pack between the gear nut and the connection portion, a bearing between the spindle and the spring pack, and a boot at the connection portion. The gear nut and the spindle linearly translate in opposite directions when the gear nut is driven. The spring pack is configured to take up slack in the linear translation assembly.

According to this embodiment, the spindle, spring pack, bearing, and boot are directly supported by a housing of the electric actuator assembly and not configured to be directly supported by a drum-in-hat adapter.

According to another embodiment, a drum brake assembly may comprise, individually and/or in combination, one or more of the following features: a brake drum, a brake shoe and lining assembly operably displaceable to contact the brake drum, a hydraulic wheel cylinder adapted to displace the brake shoe and lining assembly, a shoe anchor, a strut, an electric actuator assembly, and a lever operably positioned between the electric actuator assembly and the brake shoe and lining assembly. The drum brake assembly operates by actuating the hydraulic wheel cylinder to displace the brake shoe and lining assembly against the shoe anchor when the electric actuator assembly is unactuated, next actuating the electric actuator assembly, while the hydraulic wheel cylinder is actuated, to displace the lever against the strut and against the brake shoe and lining assembly, wherein the displaced lever clamps the brake shoe and lining assembly against the brake drum, and lastly releasing the hydraulic wheel cylinder immediately after the electric actuator assembly is actuated.

According to this embodiment, the drum brake assembly may further comprise an additional brake shoe and lining assembly and an additional lever. The additional brake shoe and lining assembly is displaced against the shoe anchor by the hydraulic wheel cylinder in when the brake shoe and lining assembly is displaced against the shoe anchor by the hydraulic wheel cylinder. The additional lever is displaced against the strut and against the additional brake shoe and lining assembly when the lever is displaced against the strut and against the brake shoe and lining assembly. The displaced additional lever clamps the additional brake shoe and lining assembly against the brake drum.

According to this embodiment, the electric actuator assembly is the shoe anchor.

According to this embodiment, the electric actuator assembly may further comprise an electric motor with an output shaft extending along a first axis, a gear reduction driven by the output shaft, a linear translation assembly having a gear nut driven by the gear reduction, and a connection portion of the linear translation assembly that actuates the brake shoe and lining assembly. The output shaft drives the gear reduction through a suitable gear type that can convert a rotation torque of the output shaft to the gear reduction at a right angle. The linear translation assembly linearly translates along a second axis when the gear nut is driven and the first axis and the second axis are perpendicular According to this embodiment, the electric actuator assembly may further comprise an electric motor with an output shaft extending along a first axis and driving a gear reduction, a linear translation assembly having a gear nut driven by the gear reduction, and a connection portion of the linear translation assembly that actuates the brake shoe and lining assembly. The linear translation assembly linearly translates along a second axis when the gear nut is driven and the first axis and the second axis are parallel.

According to this embodiment, the electric actuator assembly is not configured to function as a shoe anchor for the brake shoe and lining assembly of the drum brake assembly.

According to this embodiment, the electric actuator assembly and the shoe anchor are configured as separate and distinct components.

According to this embodiment, the drum brake assembly may further comprise a mounting flange of the electric actuator assembly, a drum-in-hat adapter to which the mounting flange is mounted, and a cradle portion of the drum-in-hat adapter. The electric actuator assembly is installed in the cradle portion by movement along an insertion axis of the drum-in-hat adapter that is perpendicular to an axle axis of the drum-in-hat adapter.

According to this embodiment, the drum brake assembly may further comprise a drive socket of the electric actuator assembly. The drive socket is configured for an external drive to actuate the brake shoe and lining assembly of the drum brake assembly.

According to this embodiment, the electric actuator assembly may further comprise a rotationally fixed spindle of the linear translation assembly, a spring pack between the gear nut and the connection portion, a bearing between the spindle and the spring pack, and a boot at the connection portion. The gear nut and the spindle linearly translate in opposite directions when the gear nut is driven. The spring pack is configured to take up slack in the linear translation assembly.

According to this embodiment, the spindle, spring pack, bearing, and boot are directly supported by a housing of the electric actuator assembly and not configured to be directly supported by a drum-in-hat adapter.

An advantage of an embodiment is a more efficient electric actuator assembly allowing use of a smaller and less expensive motor. A further advantage of an embodiment is the electric actuator assembly is interchangeable between left hand and right hand drum brake assemblies. Other advantages of this invention will become apparent to those skilled in the art from the following detailed description of the preferred embodiments, when read in light of the accompanying drawings.

BRIEF DESCRIPTION OF DRAWINGS

FIG. 31 is a section view of the electric actuator assembly of FIG. 27 installed on a drum brake assembly.

DETAILED DESCRIPTION OF THE PREFERRED EMBODIMENTS

Figure 1:
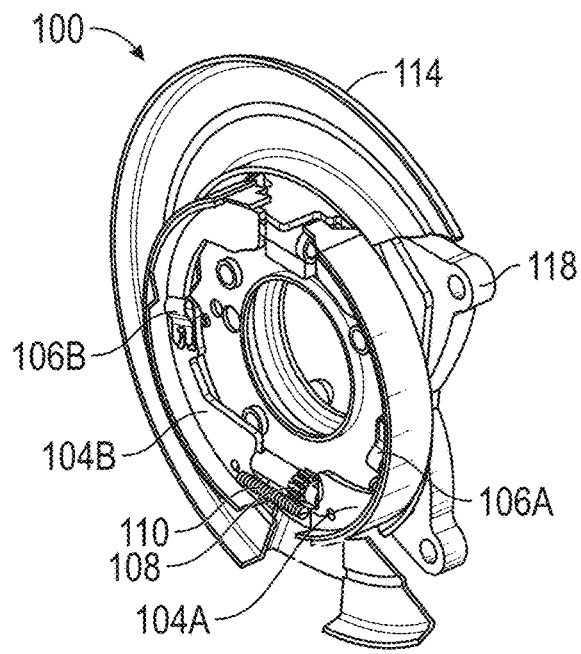
FIG. 1 is a first perspective view of a first drum brake assembly having a first embodiment of an electric actuator assembly in accordance with the present invention.
Figure 2:
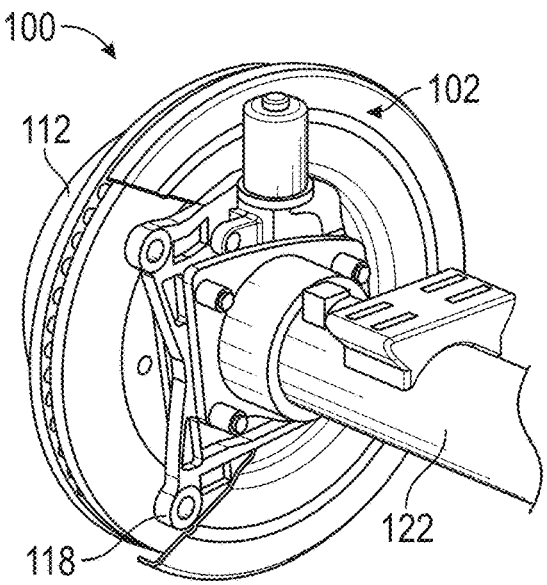
FIG. 2 is second perspective view of the first drum brake assembly of FIG. 1.
Figure 3:
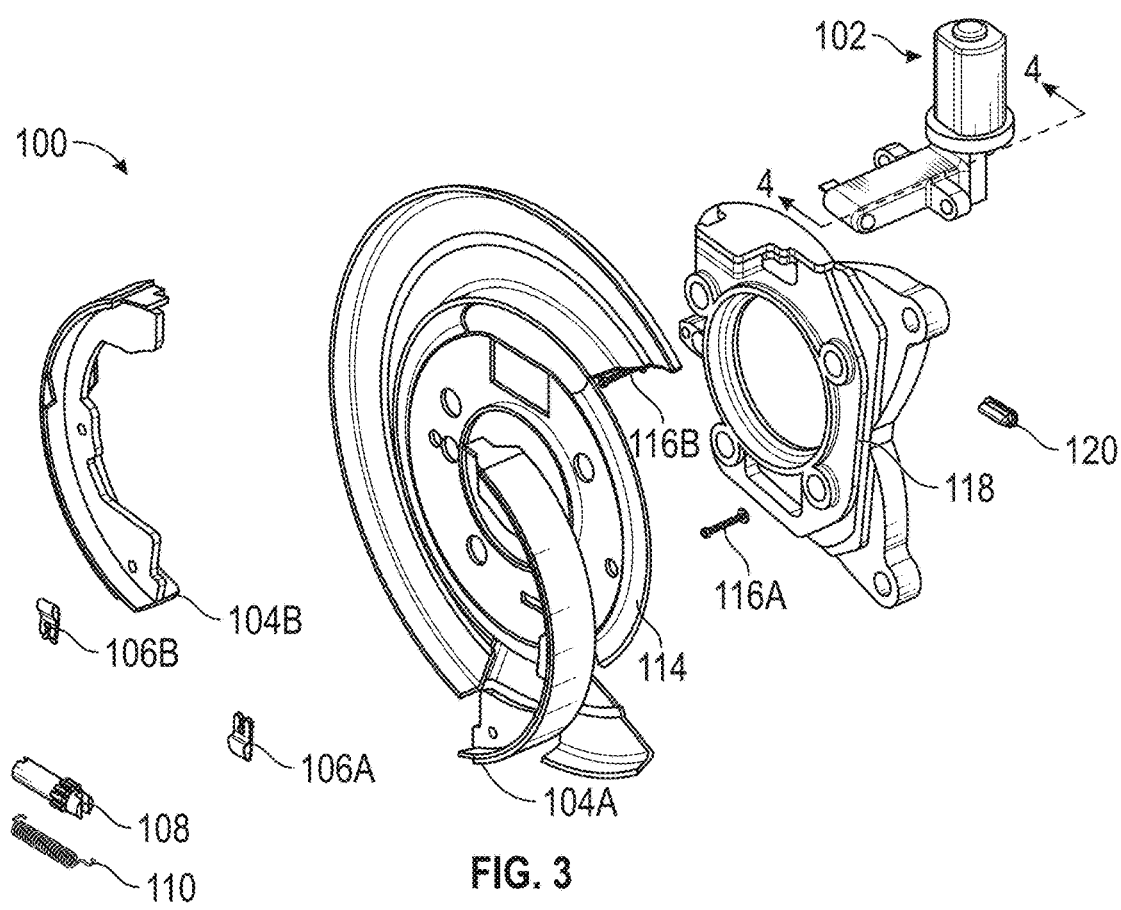
FIG. 3 is an exploded perspective view of the first drum brake assembly of FIG. 1.

Referring now to FIGS. 1-3, there is illustrated a drum brake assembly, indicated generally at 100, for a vehicle and having an electric actuator assembly, indicated generally at 102. The general structure and operation of the drum brake assembly 100 is conventional in the art. Thus, only those portions of the drum brake assembly 100 which are necessary for a full understanding of this invention will be explained and illustrated in detail. Also, although this invention will be described and illustrated in connection with the drum brake assembly 100, it will be appreciated that this invention may be used in connection with other vehicle drum brake assemblies, if so desired. As illustrated, the drum brake assembly 100 is a drum-in-hat type drum brake assembly.

The drum brake assembly 100 and electric actuator assembly 102 are scalable and flexible for usage with vehicles of different sizes and classifications. As non-limiting examples, the drum brake assembly 100 and electric actuator assembly 102 may be scaled for use with different sizes of passenger cars, crossover vehicles, sport utility vehicles, light duty trucks, or heavy duty trucks.

The drum brake assembly 100 has first and second brake shoe and lining assemblies 104A and 104B, respectively, and first and second shoe hold down clips 106A and 106B, respectively. Both an adjuster screw and nut assembly 108 and a lower shoe return spring 110 are operatively connected with the first and second brake shoe and lining assemblies 104A and 104B, respectively. The first and second brake shoe and lining assemblies 104A and 104B, respectively, are selectively operable between braking and non-braking positions. In the braking position, the first and second brake shoe and lining assemblies 104A and 104B, respectively, contact and press against a brake drum 112 to slow or otherwise stop rotation of a wheel (not shown) to which the brake drum 112 is rotationally fixed. In the non-braking position, the first and second brake shoe and lining assemblies 104A and 104B, respectively, do not contact the brake drum 112 and allow the wheel to rotate freely. The drum brake assembly 100 further has a splash shield 114, first and second shoe hold down pins 116A and 116B, respectively, a drum-in-hat adapter 118, and an adjusting hole cover 120.

The drum-in-hat adapter 118 is mounted to an axle case 122 so as to be rotationally fixed. The electric actuator assembly 102 is a separate, self-contained unit mounted to the drum brake assembly 100—e.g., the drum-in-hat adapter 118. As non-limiting examples, the electric actuator assembly 102 may be bolted or screwed to the drum-in-hat adapter 118. As will be discussed further, the electric actuator assembly 102 is mounted vertically relative to the drum brake assembly 100.

Figure 4:
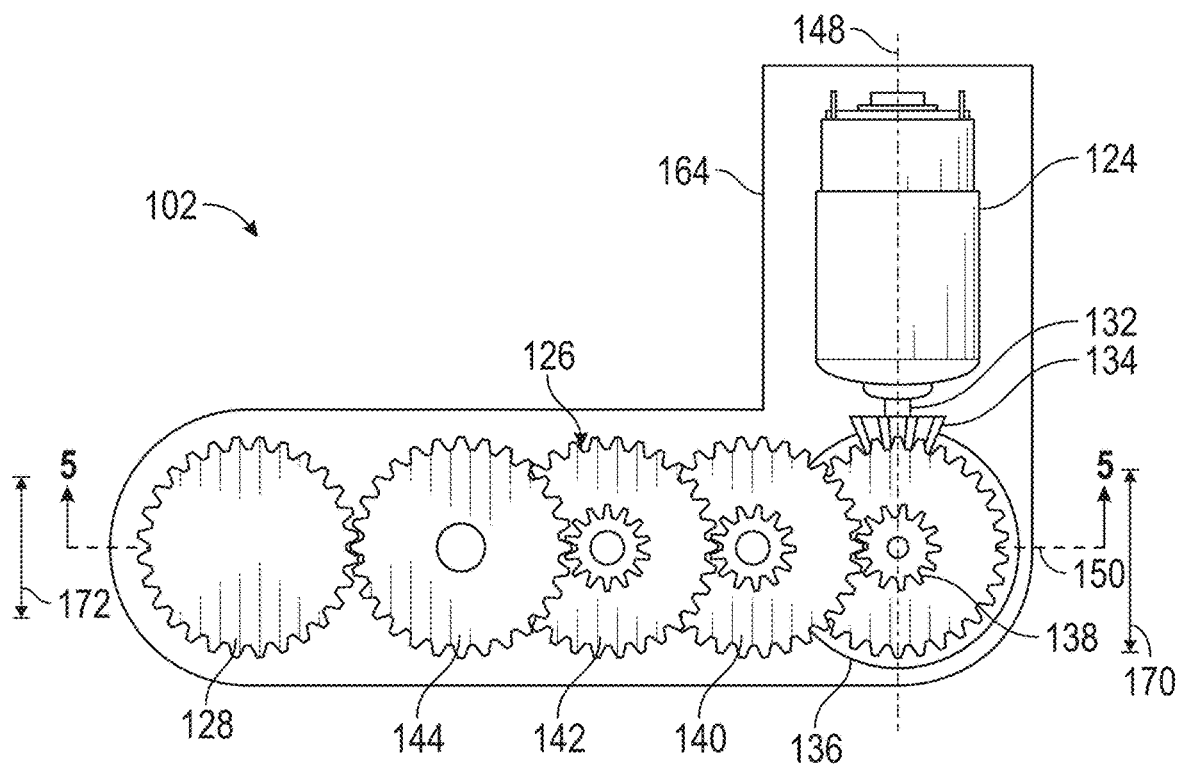
FIG. 4 is a partial section view taken along line 4-4 of FIG. 3.
Figure 5:
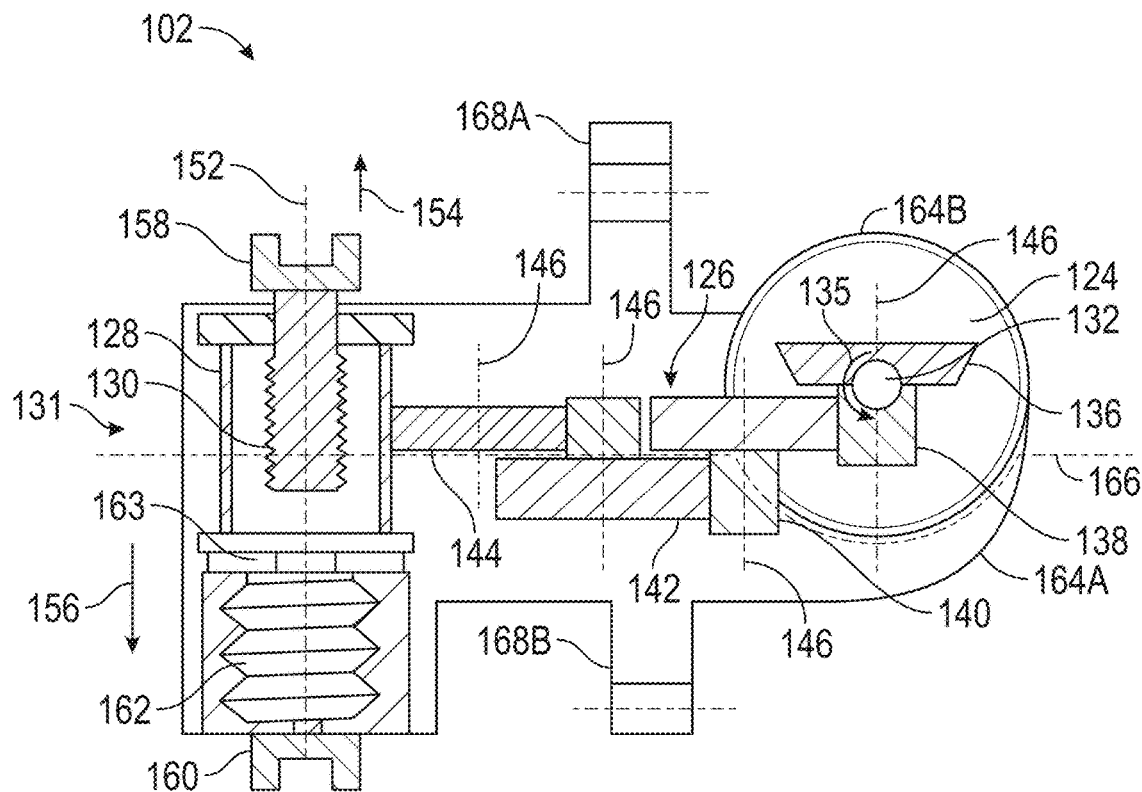
FIG. 5 is a section view taken along line 5-5 of FIG. 4.

Referring now to FIGS. 4 and 5, the electric actuator assembly 102 is illustrated in detail. The electric actuator assembly 102 comprises an electric motor 124, a gear reduction, indicated generally at 126, a final drive gear nut 128, and a spindle 130. Together, the gear nut 128 and the spindle 130 comprise a linear translation assembly, indicated generally at 131.

The electric motor 124 has an output shaft 132 that rotationally drives a bevel gear 134. Alternatively, the bevel gear 134 may be any suitable "high efficiency" gear that can convert a rotation torque 135 of the output shaft 132 to the gear reduction 126 at a right angle. As non-limiting examples, a spiral bevel gear, crown gears, hypoid gears, or other types of gears with intersecting shafts may be used in place of the illustrated bevel gear 134. As a further non-limiting example, a type of gear with non-intersecting shafts (other than a worm gear as worm gears have low efficiency) may be used in place of the illustrated bevel gear 134. The rotation torque 135 is illustrated as a counterclockwise torque in FIG. 5. One skilled in the art will recognize the rotation torque 135 will be clockwise or counterclockwise in FIG. 5 depending on which direction the electric motor 125 is operated.

The bevel gear 134 in turn drives a bevel input side 136 of a first reduction gear 138. The first reduction gear 138 then drives a second reduction gear 140, which in turn drives a third reduction gear 142. Although the gear reduction 126 is illustrated as three reduction gears—i.e., the first, second, and third reduction gears 138, 140, and 142, respectively the gear reduction 126 may alternatively have more or less than three reduction gears. The third reduction gear 142 drives an idler gear 144 that then drives the gear nut 128.

The first, second, and third reduction gears 138, 140, and 142, respectively, as well as the idler gear 144 are spur or helical gears. The first, second, and third reduction gears 138, 140, and 142, respectively, and the idler gear 144 are rotationally mounted or otherwise supported by pins 146—i.e., the first, second, and third reduction gears 138, 140, and 142, respectively, and the idler gear 144 rotate on the pins 146. The gear reduction 126, as well as the idler gear 144, are between the electric motor 124 and the gear nut 128—i.e., the gear reduction 126 is not at the electric motor 124 and the gear nut 128 is not driven by a worm gear at an end of an output shaft from the gear reduction 126.

The electric motor 124 is on a first axis 148. The output shaft 132 extends along, and rotates on, the first axis 148. The gear reduction 126 extends along a second axis 150 (the section line 5-5 in FIG. 4 is cut along the second axis 150). The first axis 148 and the second axis 150 are perpendicular such that the electric motor 124 is mounted vertically relative to the drum brake assembly 100. Thus, the electric actuator assembly 102 is interchangeable between the drum brake assemblies 100 for "left hand" and "right hand" positions or sides of the vehicle. The left hand and right hand positions are industry standard and known to those skilled in the art. For example, the left hand and right hand positions may be at opposite ends of a single axle. As illustrated, the electric motor 124 is vertically above the gear reduction 126. Alternatively, the electric motor 124 may be mounted vertically below the gear reduction 126.

Additionally, the pins 146 are perpendicular to the second axis 150. As illustrated, the pins 146 are in a single plane, although such is not necessary. The plane having the pins 146 is perpendicular to the first axis 148.

The spindle 130 is rotationally fixed. As the gear nut 128 is rotated by the idler gear 144, the gear nut 128 and the spindle 130 translate or otherwise displace in opposite directions along a third axis 152. The third axis 152 is perpendicular to the first axis 148 and the second axis 150. As illustrated, the third axis 152 is also in the plane with the pins 146, although such is not necessary. As the spindle 130 and a first connection portion 158 move in a first direction 154, the gear nut 128 and the second connection portion 160 move in a second direction 156, wherein the second direction 156 is opposite the first direction 154. Movement of the spindle 130 in the first direction 154 actuates or applies the first brake shoe and lining assembly 104A against the brake drum 112. Similarly, movement of the gear nut 128 in the second direction 156 actuates or applies the second brake shoe and lining assembly 104B against the brake drum 112.

The linear actuator assembly 131 has the first connection portion 158 of the spindle 130 that operably connects the spindle 130 with the first brake shoe and lining assembly 104A. The linear actuator assembly 131 also has the second connection portion 160 of the gear nut 128 that operably connects the gear nut 128 with the second brake shoe and lining assembly 104B. Each of the first and second connection portions 158 and 160, respectively, are U-shaped, notched, or otherwise shaped to prevent rotation of the spindle 130 when the gear nut 128 is rotated. That is, the shape of the first connection portion 158 rotationally fixes the first connection portion 158 to the first brake shoe and lining assembly 104A and the shape of the second connection portion 156 rotationally fixes the second connection portion 160 to the second brake shoe and lining assembly 104B. The shape of the first and second connection portions 158 and 160, respectively,—i.e., non-rotation of the spindle 130 provide a spread lock function for the drum brake assembly 100.

Alternatively, one or both of the first or second connection portions 158 or 160, respectively, may be rotationally fixed to the first or second brake shoe and lining assembly 104A or 104B, respectively, by other than the shape of the first or second connection portions 158 and/or 160, respectively. As a non-limiting example, the first or second connection portions 158 or 160, respectively, may have a pin connection to the first or second brake shoe and lining assembly 104A and 104B, respectively.

A bevel spring pack 162 is positioned between the gear nut 128 and the second connection portion 160. The bevel spring pack 162 takes up slack in the linear translation assembly 131. The bevel spring pack 162 compresses when the gear nut 128 moves in the second direction. A bearing 163 is provided between the spindle 130 and the bevel spring pack 162. As illustrated, the bearing 163 is an axial needle roller bearing. Alternatively, the bearing 163 may be other than an axial needle roller bearing.

The electric actuator assembly 102 is in a housing 164. The housing 164 has a housing split line 166 (illustrated by a dashed line in FIG. 5) such that the housing 164 comprises first and second housing parts 164A and 164B, respectively. The electric motor 124, the gear reduction 126, the gear nut 128, and the spindle 130 may be installed in the first and second housing parts 164A and 164B, respectively, and the first and second housing parts 164A and 164B, respectively, then closed together—e.g., screwed or otherwise sealed together—such that the electric actuator assembly 102 is readily mounted as an assembled unit during assembly of the drum brake assembly 100. As a non-limiting example, the housing 164 may be fabricated from plastic. The housing 164 further has first and second mounting flanges 168A and 168B for installation of the electric actuator assembly 102.

In FIGS. 1-3, the electric actuator assembly 102 is not a shoe anchor for the first and second brake shoe and lining assemblies, 104A and 104B, respectively.

The first, second, and third reduction gears 138, 140, and 142, respectively, as well as the idler gear 144, are sized such that their diameters 170 are no larger than a gear nut diameter 172 of the gear nut 128. As such, the housing 164 around the gear nut 128 and the gear reduction 126 has a constant profile and is minimized in size. This eases installation of the electric actuator assembly 102 through the drum-in-hat adapter 118.

Figure 6:
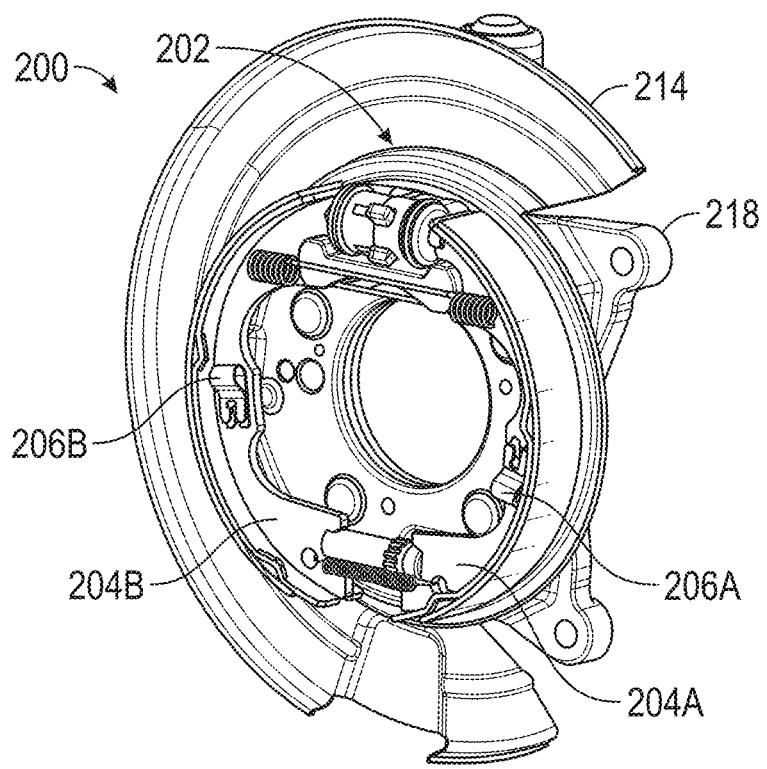
FIG. 6 is a first perspective view of a second drum brake assembly having a second embodiment of an electric actuator assembly in accordance with the present invention.
Figure 7:
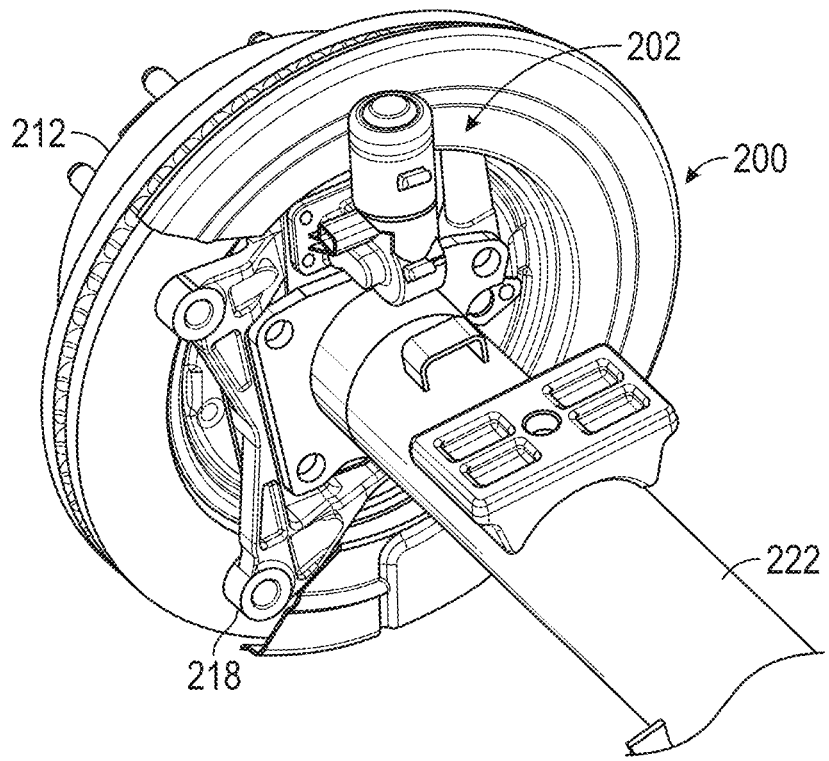
FIG. 7 is a second perspective view of the second drum brake assembly of FIG. 6.
Figure 8:
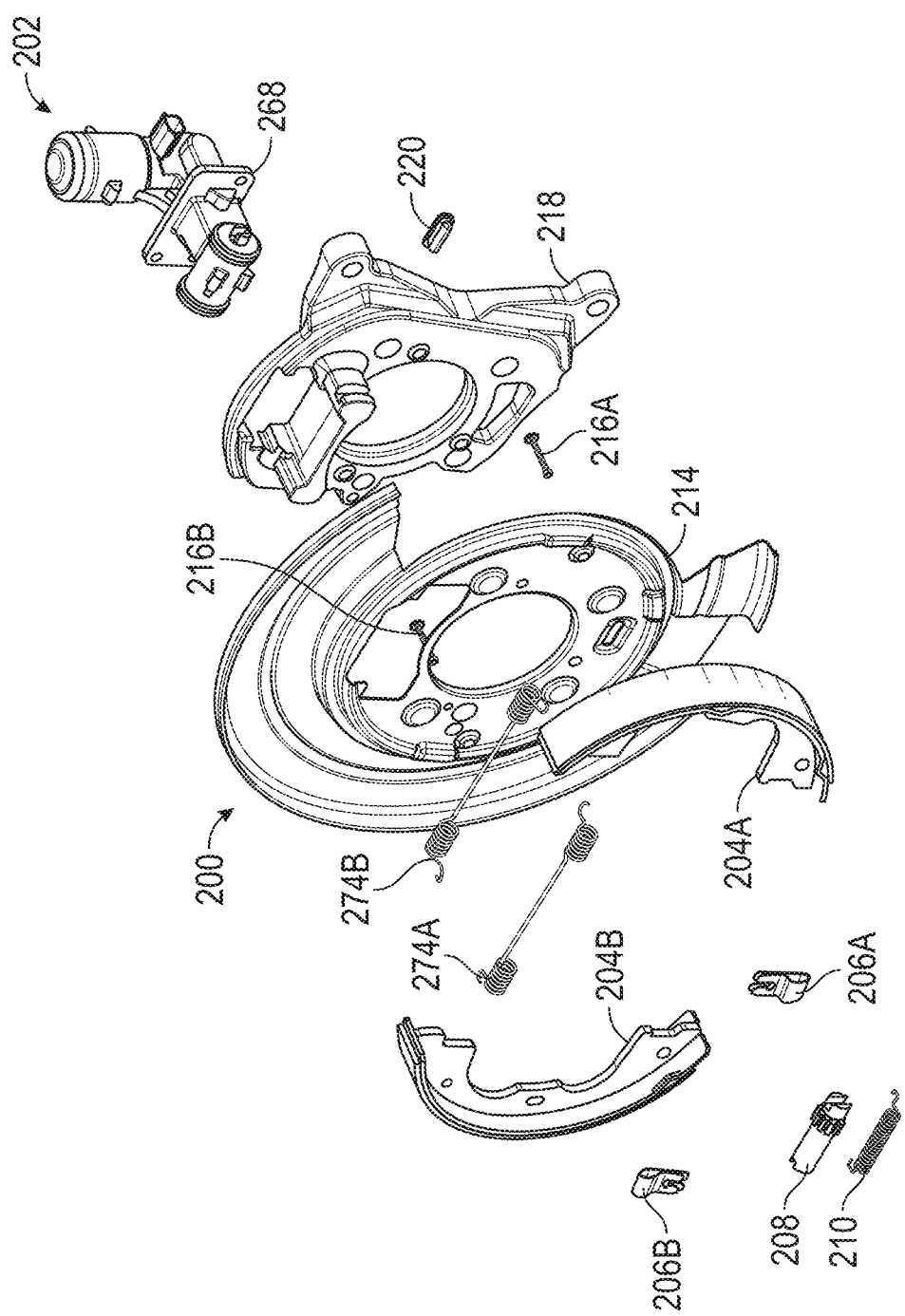
FIG. 8 is an exploded perspective view of the second drum brake assembly of FIG. 6.

Referring now to FIG. 6-8, there is illustrated a drum brake assembly, indicated generally at 200, having an electric actuator assembly, indicated generally at 202. Because the drum brake assembly 200 and electric actuator assembly 202 are variations of the drum brake assembly 100 and electric actuator assembly 102, respectively, like reference numerals, increased by 100, designate corresponding parts in the drawings and detailed description thereof will be omitted, unless otherwise noted.

The drum brake assembly 200 has first and second upper shoe return springs 274A and 274B, respectively, connecting first and second brake shoe and lining assemblies 204A and 204B, respectively.

Figure 9:
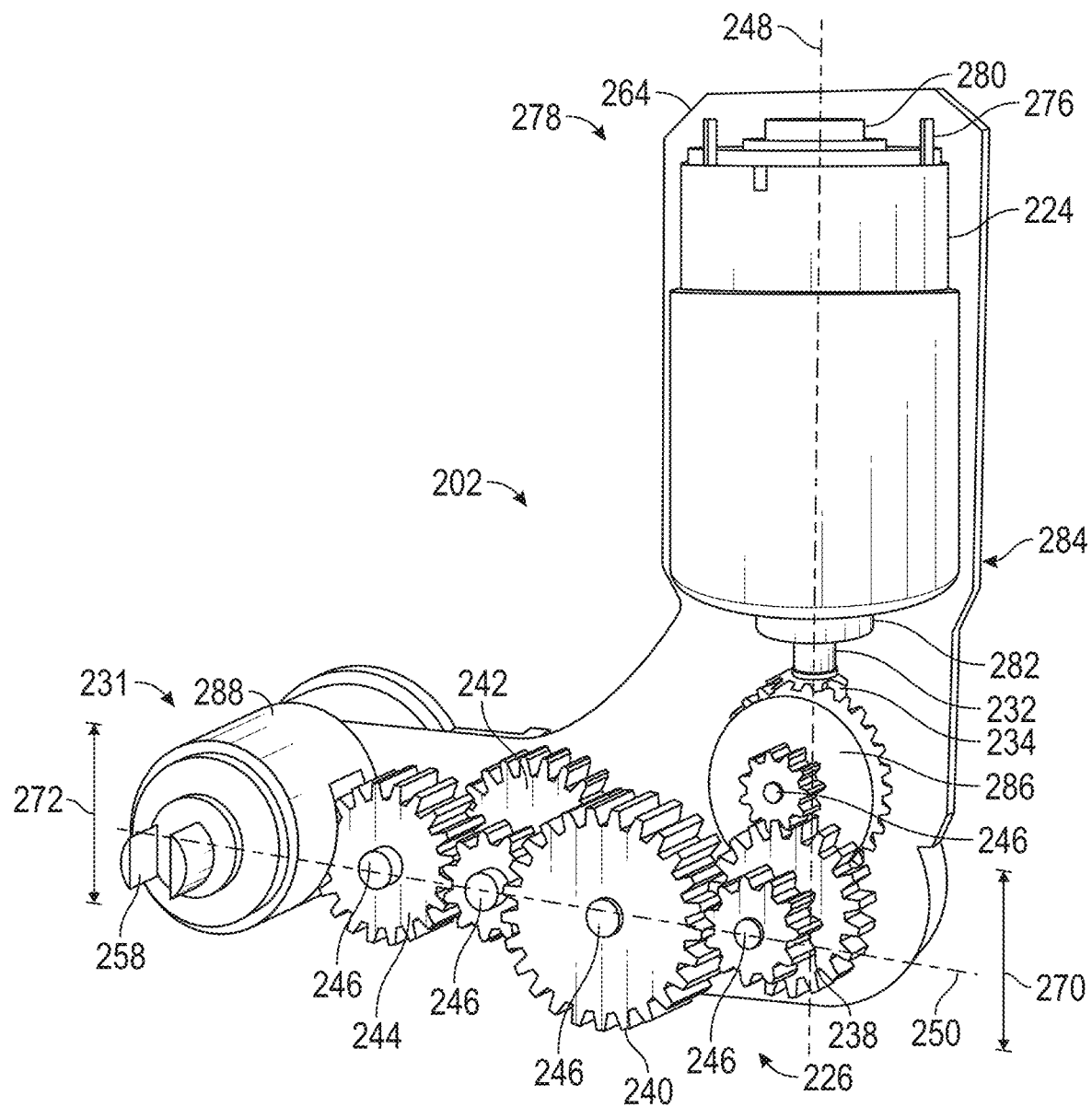
FIG. 9 is a first cutaway perspective view of the second electric actuator assembly of FIG. 6.
Figure 10:
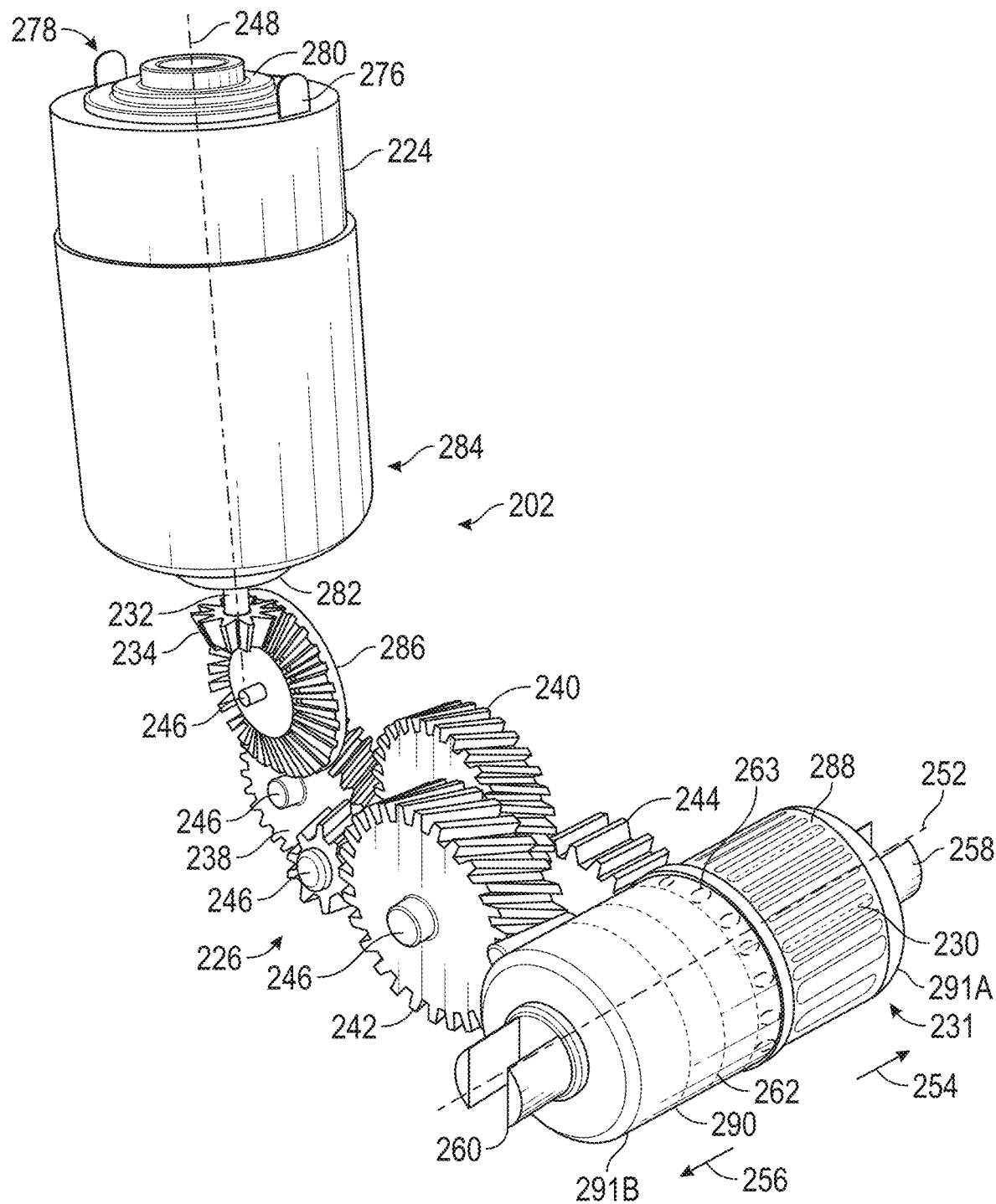
FIG. 10 is a second cutaway perspective view of the second electric actuator assembly of FIG. 6.

Referring now to FIGS. 9 and 10, the electric actuator assembly 202 is illustrated in detail. The electric motor 224 has motor contacts 276 at a first motor end, indicated generally at 278. The motor contacts 276 are for supply of electrical energy to the electric motor 224 for operation of the electric motor 224. Also at the first motor end 278 is first damping material 280. As a non-limiting example, the first damping material 280 may be an elastomer material such as rubber. Second damping material 282 is provided at a second motor end, indicated generally at 284 and opposite the first motor end 278. Again, as a non-limiting example, the second damping material 282 may also be an elastomer material such as rubber. Positions of the motor contacts 276, first damping material 280, and second damping material 282 are not limited to those illustrated. Furthermore, one or both of the first and second damping material 280 and 282, respectively, may be omitted.

An intermediate gear 286 is driven by an output shaft 232 and in turn drives a first reduction gear 238. A bushing 288 partially covers a gear nut 228 while allowing access for an idler gear 244 to drive the gear nut 228. An interior surface of the bushing 288 is preferably provided with a low friction surface, coating, or other lubrication. A bellows 290 covers a bevel spring pack 262 (shown by hidden lines). The electric actuator assembly 202 has first and second boots 291A and 291B, respectively. The first and second boots 291A and 291B, respectively, prevent or otherwise reduce infiltration of dust or other contaminants into the electric actuator assembly 202.

The electric actuator assembly 202 includes a spindle 230, the bevel spring pack 262, a bearing 263, and the first and second boots 291A and 291B, respectively. Thus, the electric actuator assembly 202 contains a complete electric-mechanical shoe apply mechanism. The spindle 230, bevel spring pack 262, bearing 263, and first and second boots 291A and 291B, respectively, are directly supported by a housing 264 (shown in FIG. 16) and the housing 264 is in turn directly supported on the drum-in-hat adapter 218. The spindle 230, bevel spring pack 262, bearing 263, and first and second boots 291A and 291B, respectively, are not in, or otherwise directly contained or supported by, a drum-in-hat adapter 218.

Figure 11:
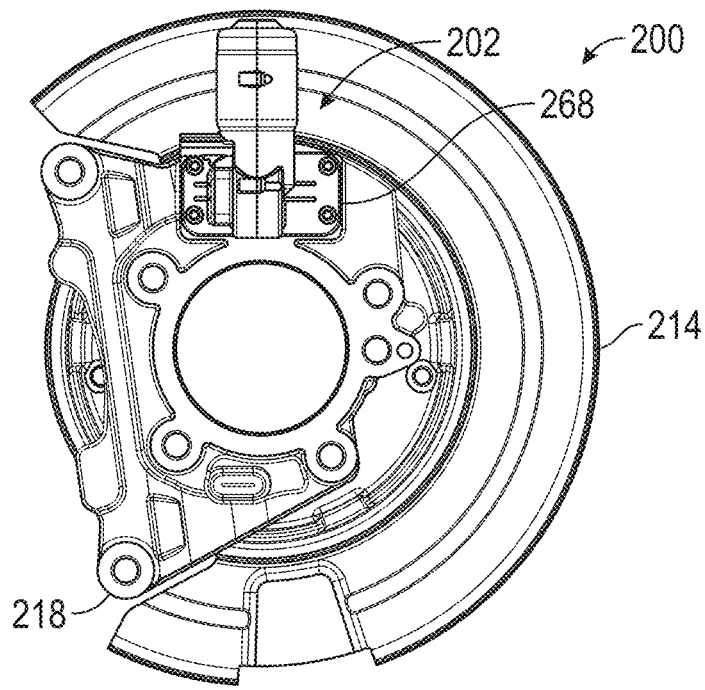
FIG. 11 is a first elevation view of the second drum brake assembly of FIG. 6 in a first installation position.
Figure 12:
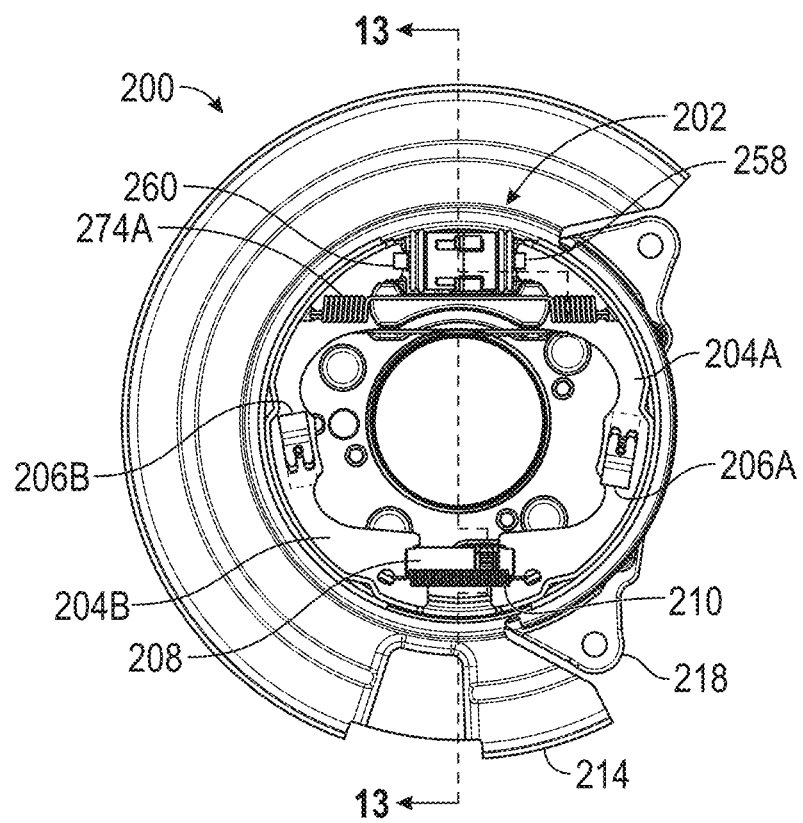
FIG. 12 is a second elevation view of the second drum brake assembly of FIG. 6 in the first installation position.
Figure 13:
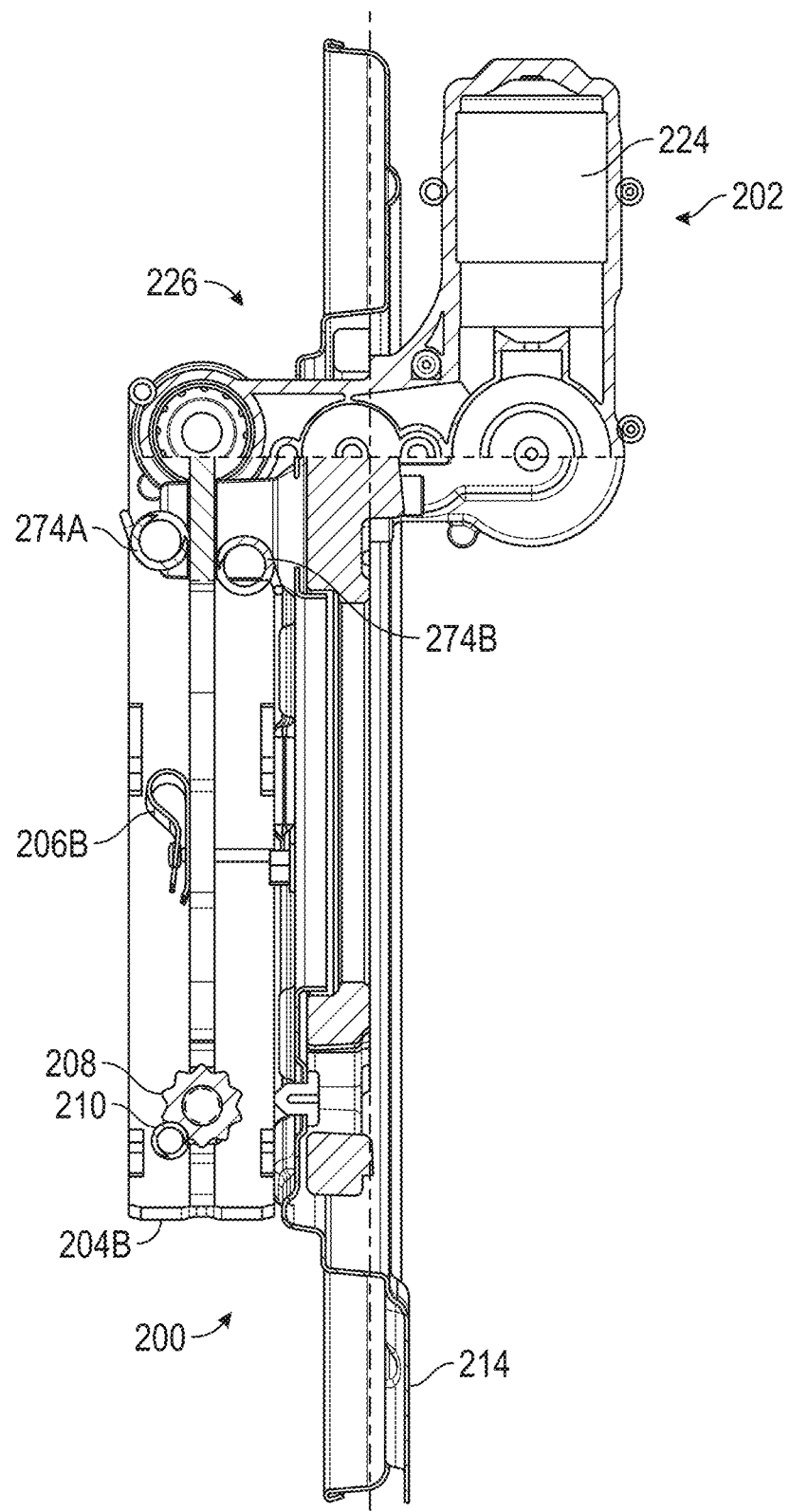
FIG. 13 is a section view taken along line 13-13 of FIG. 12.
Figure 14:
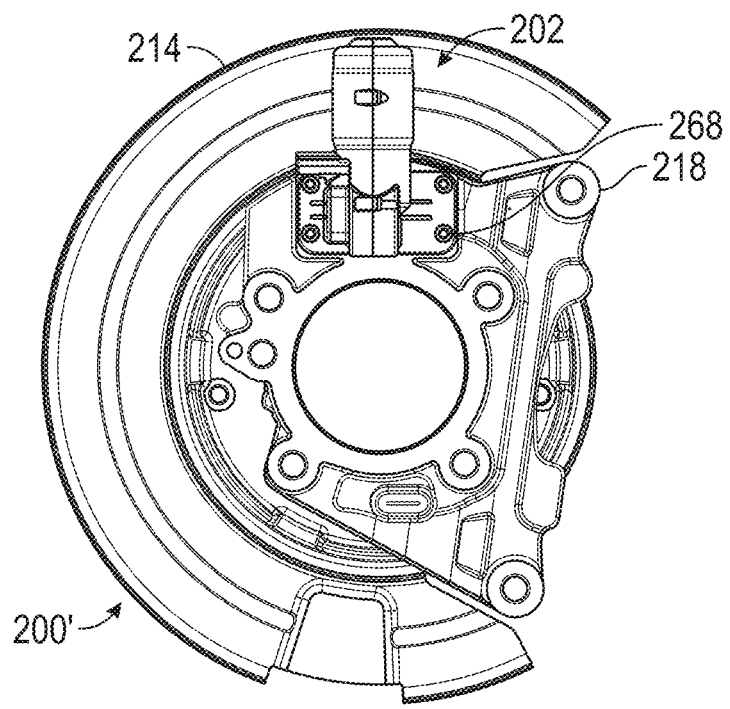
FIG. 14 is a first elevation view of the second drum brake assembly of FIG. 6 in a second installation orientation.
Figure 15:
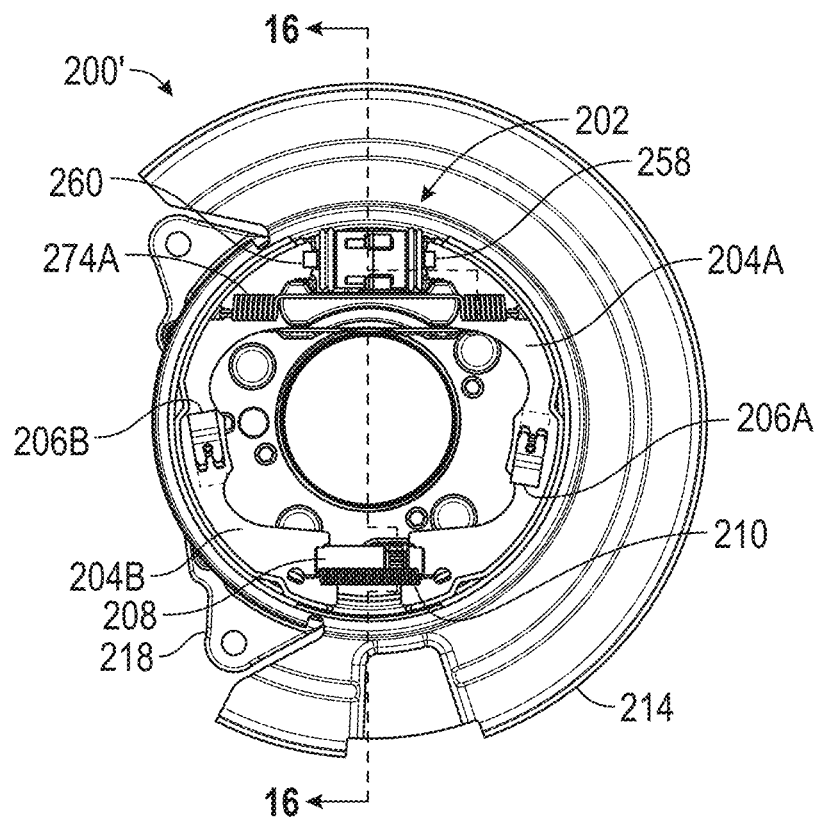
FIG. 15 is a second elevation view of the second drum brake assembly of FIG. 6 in the second installation orientation.
Figure 16:
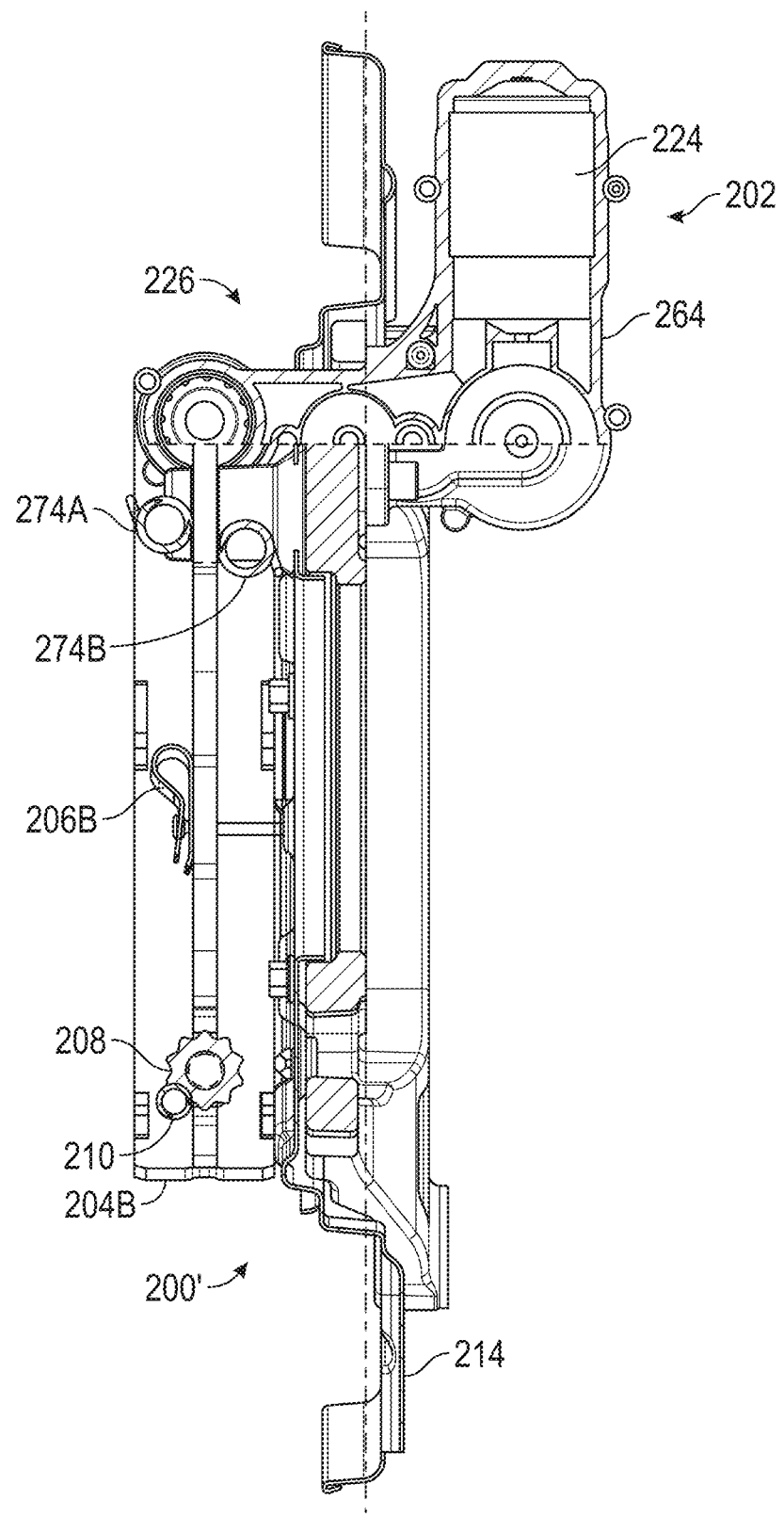
FIG. 16 is a section view taken along line 16-16 of FIG. 15.

Referring now to FIGS. 11-13, there is illustrated the electric actuator assembly 202 mounted on the drum brake assembly 200. In FIGS. 11-13 the drum brake assembly 200 is in a first—i.e., the left hand—installation position (also illustrated in FIGS. 7 and 8). Referring further to FIGS. 14-16, there is illustrated the electric actuator assembly 202 mounted on a drum brake assembly 200', wherein the drum brake assembly 200' is in a second—i.e., the right hand—installation position. Other than having the right hand position, the drum brake assembly 200' is unchanged from the drum brake assembly 200 in the left hand position. The electric actuator assembly 202 is interchangeable between the left hand position drum brake assembly 200 and the right hand position drum brake assembly 200'. That is, the electric actuator assembly 202 may be mounted on and actuate either the left hand position drum brake assembly 200 or the right hand position drum brake assembly 200' without modification or changes to the electric actuator assembly 202. For both the left hand position drum brake assembly 200 and the right hand position drum brake assembly 200' the electric motor 224 is vertically mounted.

Figure 17:
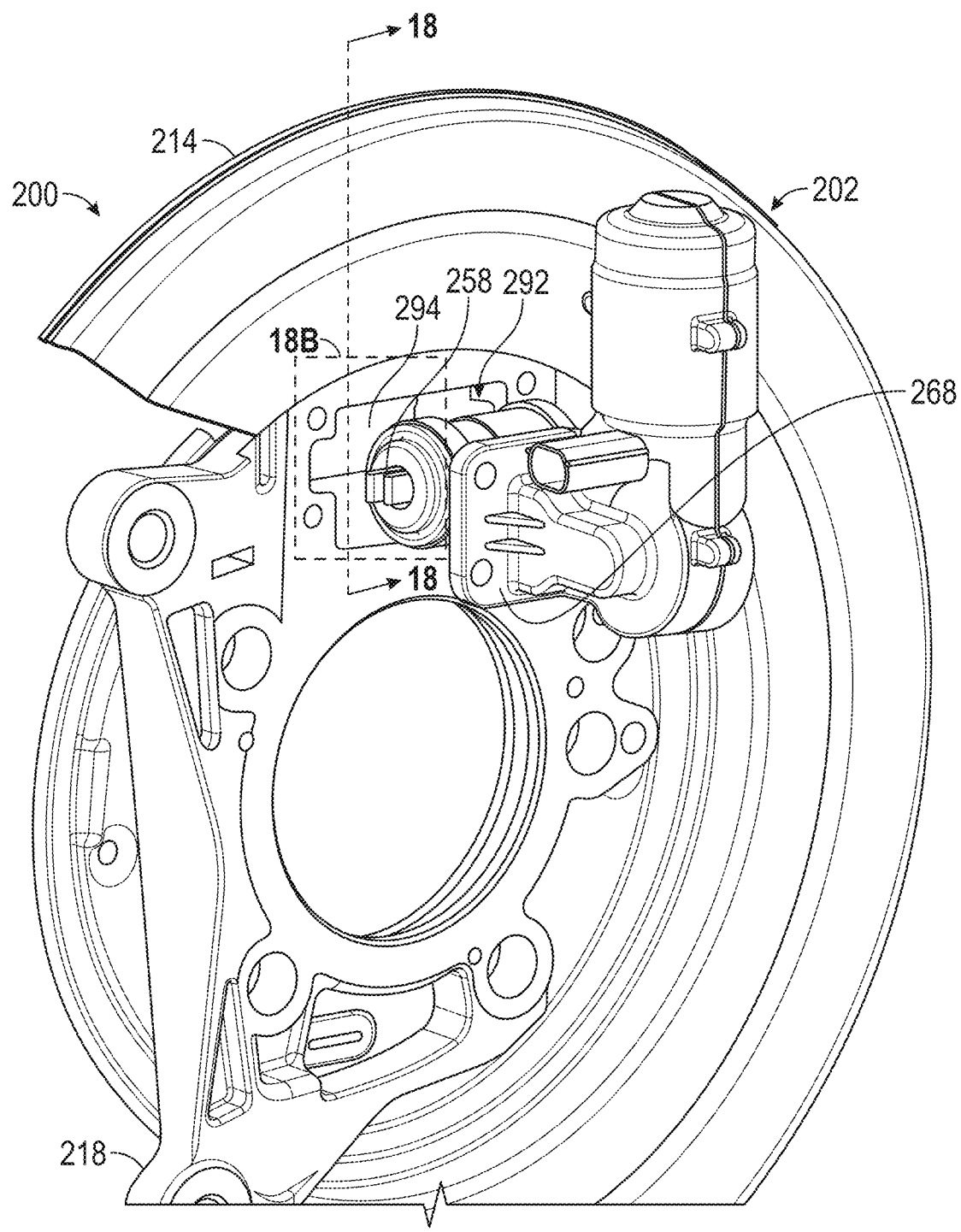
FIG. 17 is a partially exploded perspective view showing mounting of the second electric actuator assembly of FIG. 6 on the second drum brake assembly of FIG. 6.
Figure 18C:
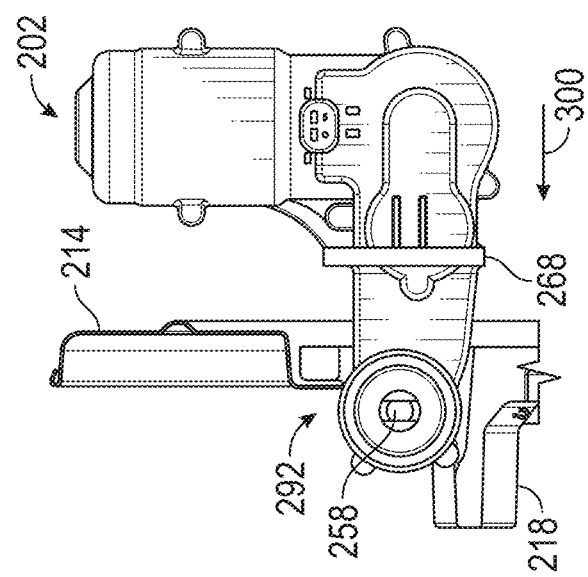
FIGS. 18C-18E are additional section views taken along line 18-18 of FIG. 17.
Figure 18B:
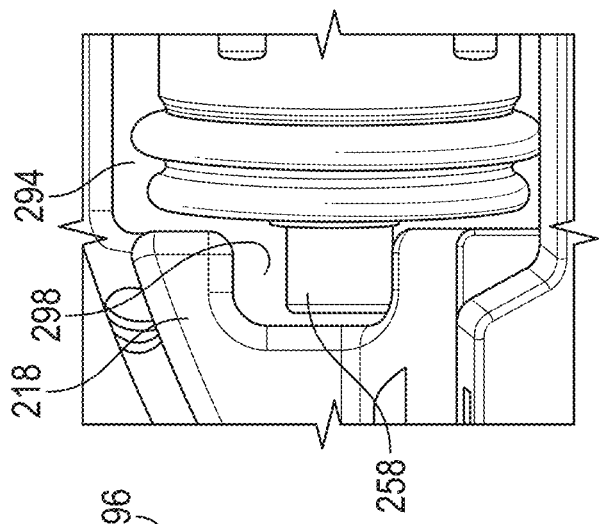
FIG. 18B is an enlarged portion of FIG. 17.
Figure 18A:
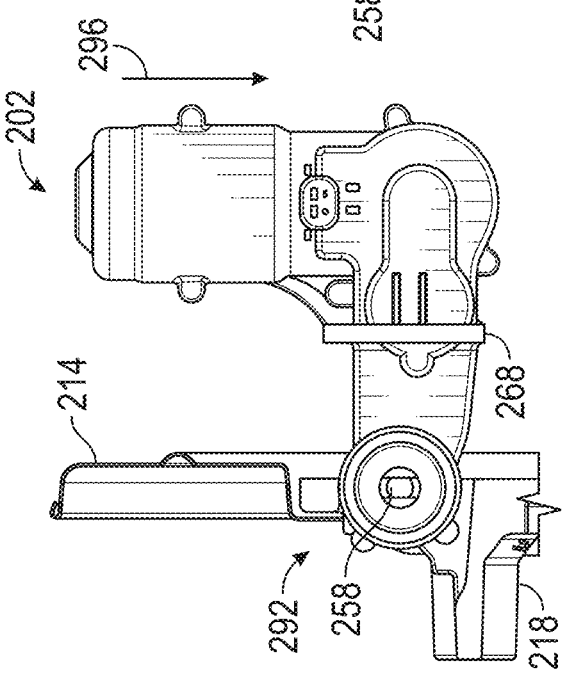
FIGS. 18A is a section view taken along line 1848 of FIG. 17.
Figure 18D:
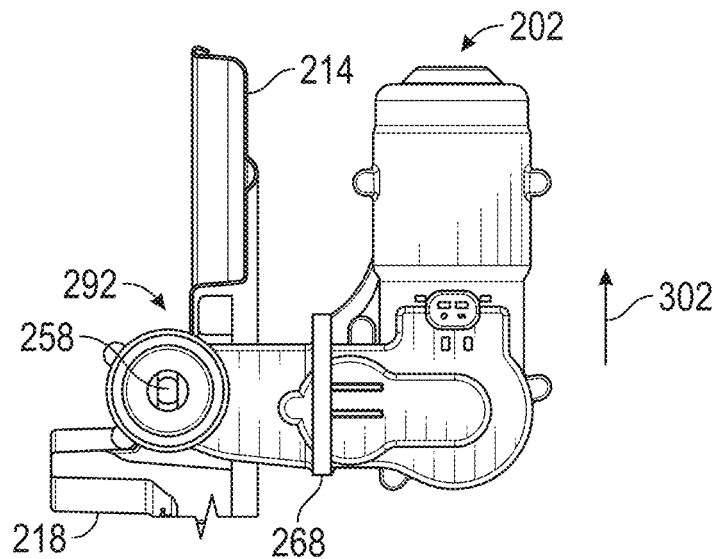
Figure 18E:
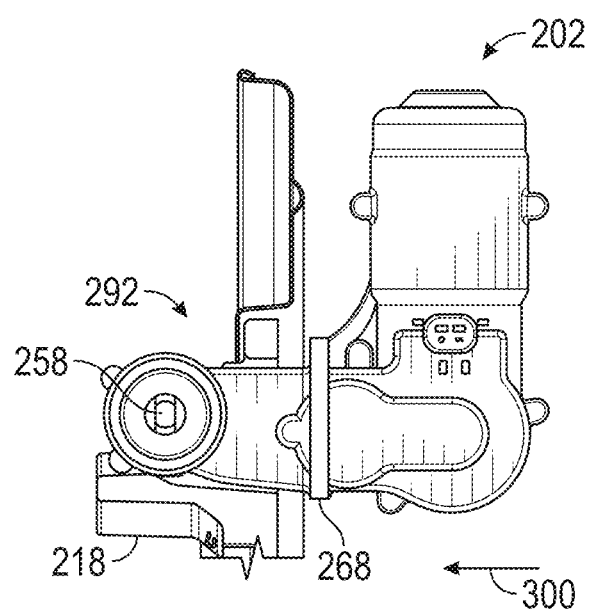
Figure 19:
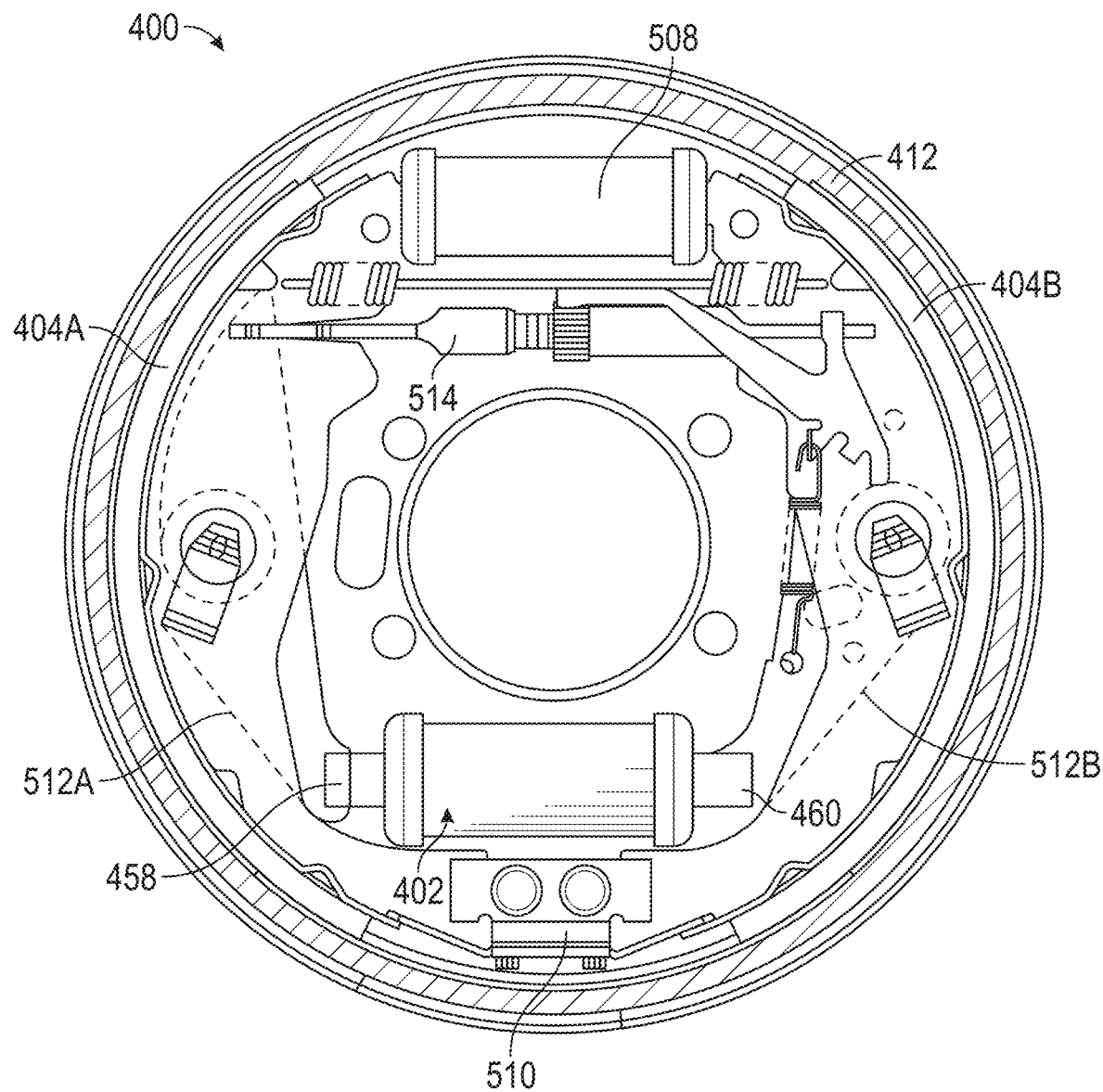
FIG. 19 is an elevation view of a third drum brake assembly having a third embodiment of an electric actuator assembly in accordance with the present invention.
Figure 20:
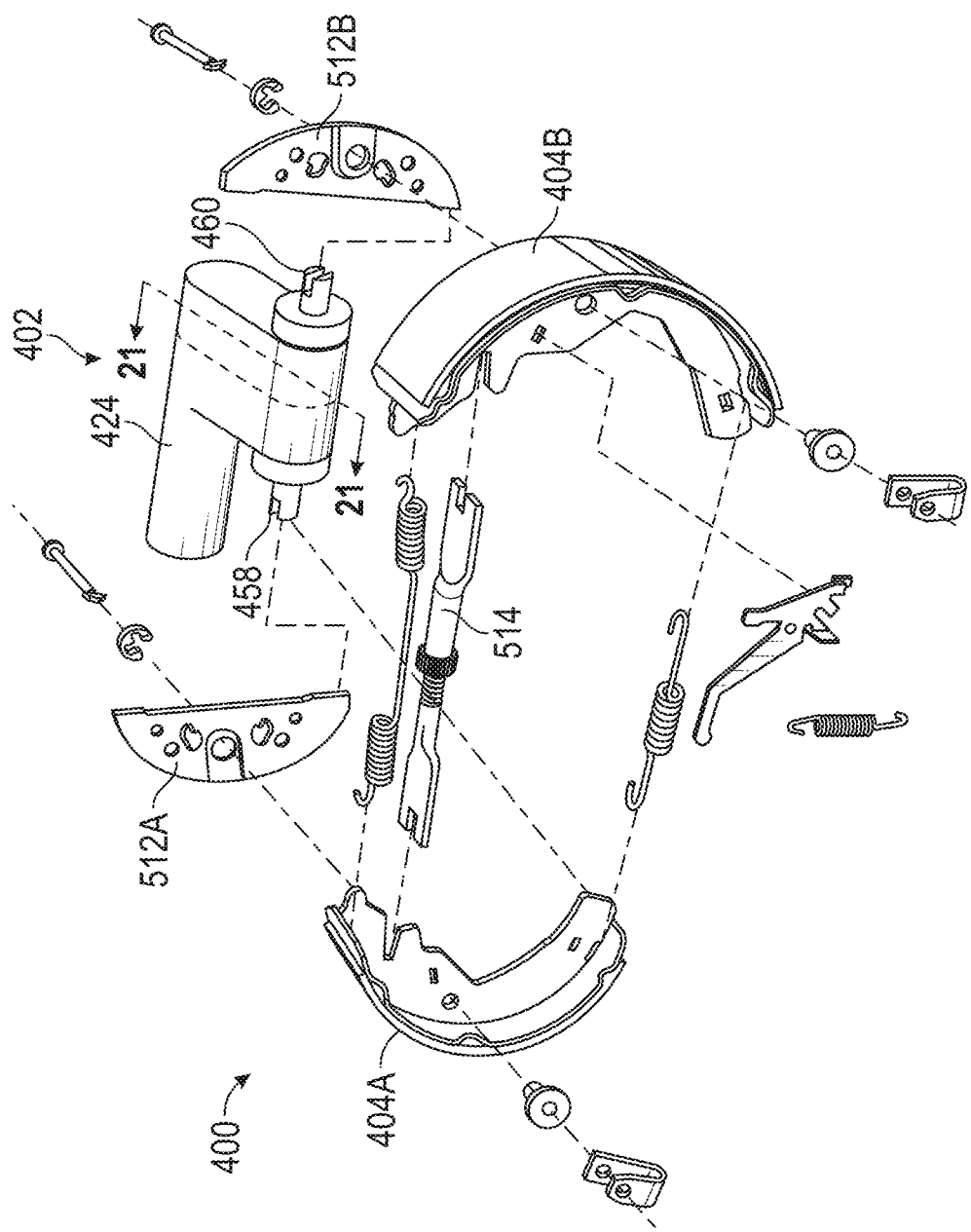
FIG. 20 is an exploded perspective view of the third drum brake assembly of FIG. 19.

Referring now to FIGS. 17-18E, there is illustrated mounting—i.e., installation—of the electric actuator assembly 202 on the drum brake assembly 200. Specifically, the electric actuator assembly 202 is mounted to the drum-in-hat adapter 218. Prior to the position illustrated in FIG. 18A, an actuator end portion, indicated generally at 292, of the electric actuator assembly 202 is partially inserted through an opening 294 in the drum-in-hat adapter 218. The actuator end portion 292 contains the gear nut 228 and the spindle 230 of the electric actuator assembly 202.

In FIG. 18A, the electric actuator assembly 202 is moved downward in a first direction 296 (the electric actuator assembly 202 is moved downward relative to an installation position illustrated in FIG. 18E). The electric actuator assembly 202 is moved in the first direction 296 until, as shown in FIG. 18B, a first connection portion 258 vertically aligns with a pocket or other notched portion 298 of the opening 294. Although not illustrated, a second connection portion 260 also vertically aligns with a similar pocket portion extending from the opening 294 that is opposite the illustrated pocket portion 298. At the same time, as illustrated in FIG. 18A, an outermost part of the actuator end portion 292 has initially entered the opening 294.

Then, in FIG. 18C, the electric actuator assembly 202 is moved forward in a second direction 300 such that the first connection portion 258 passes through the pocket portion 298 (and the second connection portion 260 passes through its corresponding pocket portion).

Subsequently, in FIG. 18D, the first and second connection portions 258 and 260, respectively, have passed through the opening 294 and the electric actuator assembly 202 is raised in a third direction 302. The third direction 302 is opposite the first direction 296 and the electric actuator assembly 202 is raised in the third direction 302 equal to an amount the electric actuator assembly 202 was lowered in the first direction 296.

Lastly, in FIG. 18E, the electric actuator assembly 202 is further moved forward in the second direction 300 until a mounting flange 268 is in position for mounting to the drum-in-hat adapter 218 and the electric actuator assembly 202 is in the installation position. The electric actuator assembly 202 is then mounted to the drum-in-hat adapter 218 by suitable means.

Referring now to FIGS. 19-22, there is illustrated a drum brake assembly, indicated generally at 400, having an electric actuator assembly, indicated generally at 402. Because the drum brake assembly 400 and electric actuator assembly 402 are variations of the drum brake assembly 100 and electric actuator assembly 102, like reference numerals, increased by 300, designate corresponding parts in the drawings and detailed description thereof will be omitted, unless otherwise noted.

The drum brake assembly 400 is a variation of the drum brake assembly disclosed in U.S. Pat. No. 5,275,260 to Evans et al., the disclosure of which is incorporated by reference in entirety herein. Although the electric actuator assembly 402 will be described and illustrated in connection with the drum brake assembly 400, it will be appreciated that the electric actuator assembly 402 may be used as described in connection with other vehicle drum brake assemblies, if so desired. Similarly, although actuation of the drum brake assembly 400 will be described and illustrated in connection with the electric actuator assembly 402, it will be appreciated that the drum brake assembly 400 may be actuated as described by electric actuator assemblies other than the electric actuator assembly 402. As non-limiting examples, the drum brake assembly 400 may be actuated by the electric actuator assembly 102 of FIGS. 1-5 or the electric actuator assembly 202 of FIGS. 6-18.

Figure 21:
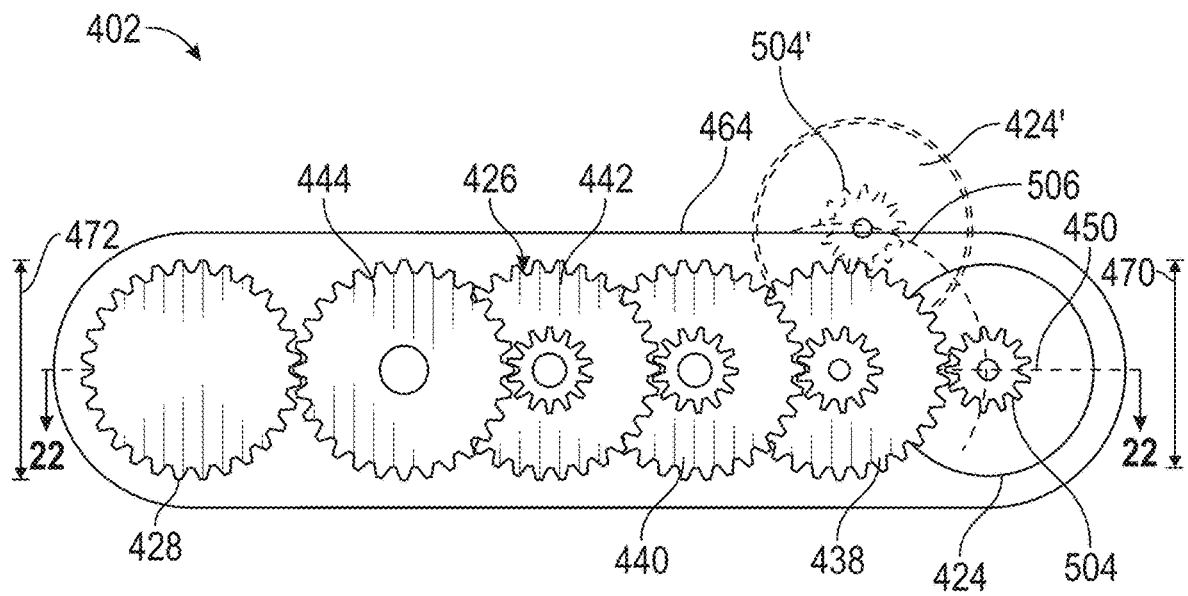
FIG. 21 is a section view taken along line 21-21 of FIG. 20.

An electric motor 424 of the electric actuator assembly 402 is oriented fore to aft—i.e., horizontally—instead of vertically. As such, the electric actuator assembly 402 does not include a bevel gear between the electric motor 424 and a gear reduction 426. Instead, a first gear 504 is mounted on an output shaft 432 of the electric motor 424 and drives a first reduction gear 438 of the gear reduction 426. The electric motor 424 may be positioned such that an output shaft 432 of the electric motor 424 is located along an arc 506. For example, in FIGS. 20-22, the electric motor 424 is positioned horizontally and in a same plane as the gear reduction 426. Alternatively, as also shown in FIG. 21 and as a non-limiting example, an electric motor 424' and a first gear 504' (both shown in phantom lines) may be positioned horizontally and vertically separated from the gear reduction 526 with a housing 464 modified accordingly. Alternatively, the electric motor 424 may be oriented other than as illustrated. As a non-limiting example, the electric motor 424 may be oriented vertically such as is illustrated in. FIGS. 1-18.

The drum brake assembly 400 further includes a hydraulic wheel cylinder 508, a shoe anchor 510 that is separate and distinct from the electric actuator assembly 402, first and second levers 512A and 512B, respectively, and a strut 514. Alternatively, the shoe anchor 510 may be omitted with the electric actuator assembly 402 serving as a shoe anchor. The drum brake assembly 400 further has a first connection portion 458 between the electric actuator assembly 402 and the first lever 512A and a second connection portion 460 between the electric actuator assembly 402 and the second lever 512B. Although illustrated with both the first and second levers 512A and 512B, respectively, the drum brake assembly 400 may also have only one of the first and second levers 512A and 512B, respectively.

Figure 23:
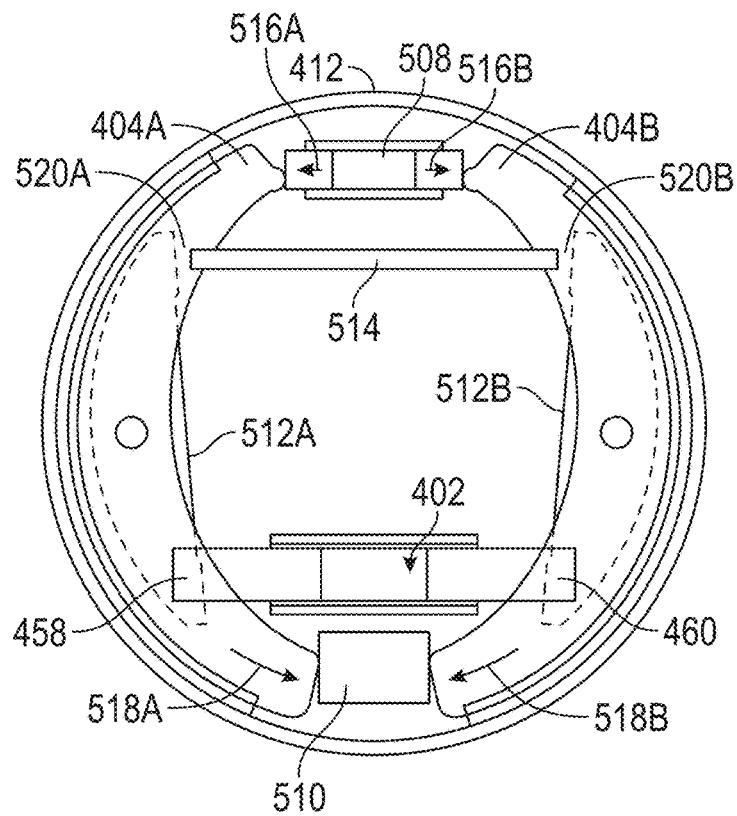
FIG. 23 is a schematic elevation view of the third drum brake assembly of FIG. 19 in a first state of operation.

Referring now to FIG. 23, the drum brake assembly 400 has the hydraulic wheel cylinder 508 applied, indicated by arrows 516A and 516B, and the electric actuator assembly 402 not applied. The first and second brake shoe and lining assemblies 404A and 404B, respectively, have rotated, indicated by arrows 518A and 518B, to contact the shoe anchor 510 and press against the brake drum 412 (when the shoe anchor 510 is omitted, the first and second brake shoe and lining assemblies 404A and 404B, respectively, contact the electric actuator assembly 402 when rotated). With the electric actuator assembly 402 not applied, the first and second levers 512A and 512B, respectively, are not in contact with the strut 514. Specifically, there is a first gap 520A between the first lever 512A and the strut 514 and a second gap 520B between the second lever 512B and the strut 514. Alternatively, the drum brake assembly 400 may be configured such that there is only one of the first and second gaps 520A and 520B, respectively, when the hydraulic wheel cylinder 508 is applied and the electric actuator assembly 402 is not applied. In FIG. 23, the drum brake assembly 400 is operating in a leading-trailing mode.

Figure 22:
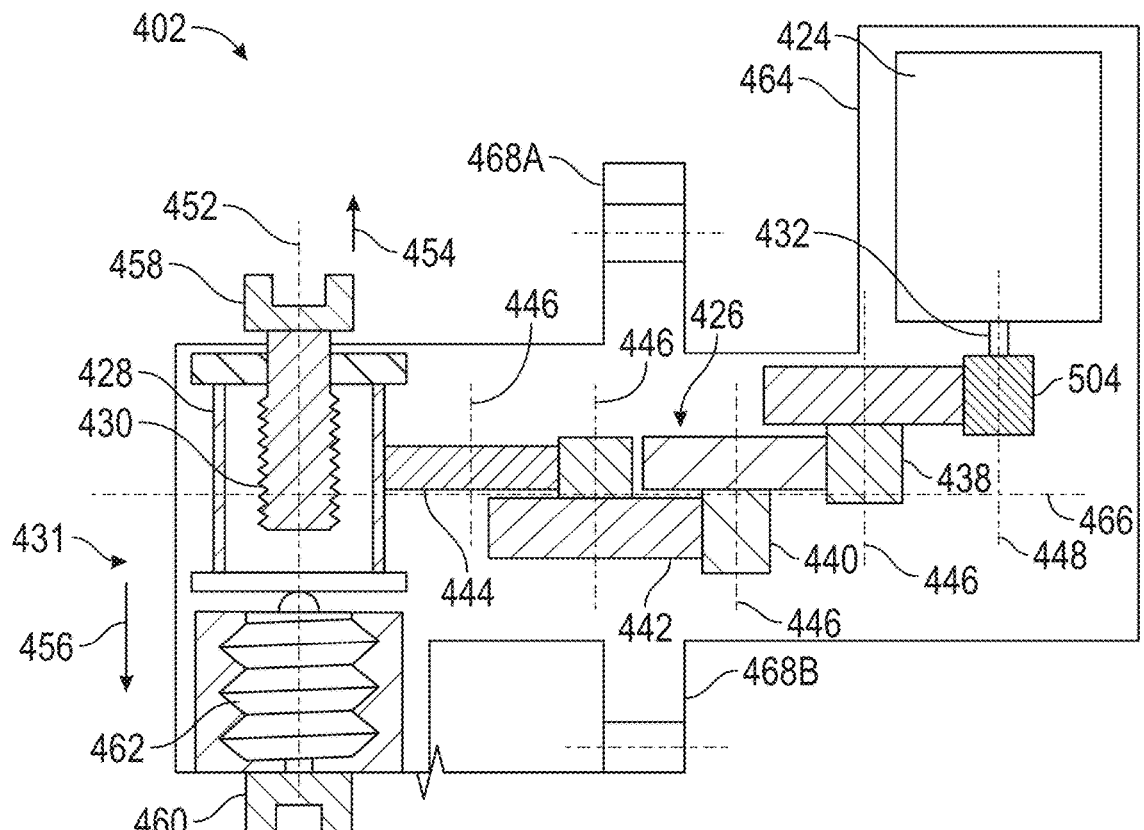
FIG. 22 is a section view taken along line 22-22 of FIG. 21.
Figure 24:
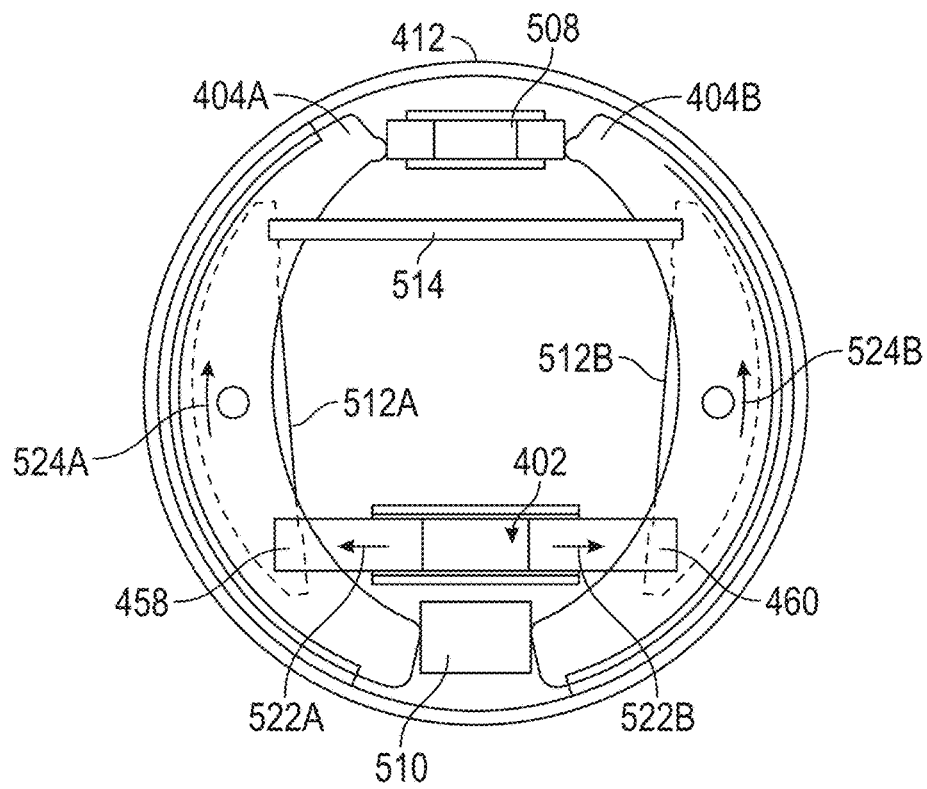
FIG. 24 is a schematic elevation view of the third drum brake assembly of FIG. 19 in a second state of operation.

Referring now to FIG. 24, the hydraulic wheel cylinder 508 remains applied and the electric actuator assembly 402 is applied, indicated by arrows 522A and 522B, in first and second directions 454 and 456, respectively (shown in FIG. 22). The first and second brake shoe and lining assemblies 404A and 404B, respectively, remain contacting the shoe anchor 510. The first lever 512A rotates, indicated by arrow 524A, and moves to clamp the first brake shoe and lining assembly 404A against a brake drum 412. Similarly, the second lever 512B rotates, indicated by arrow 524B, and moves to clamp the second brake shoe and lining assembly 404B against the brake drum 412. The electric actuator assembly 402 has rotated or pivoted the first and second levers 512A and 512B, respectively, such that the first and second levers 512A and 512B, respectively, contact the strut 514 and the first and second gaps 520A and 520B, respectively, (shown in FIG. 23) are closed. The drum brake assembly 400 continues to operate in the leading-trailing mode.

Figure 25:
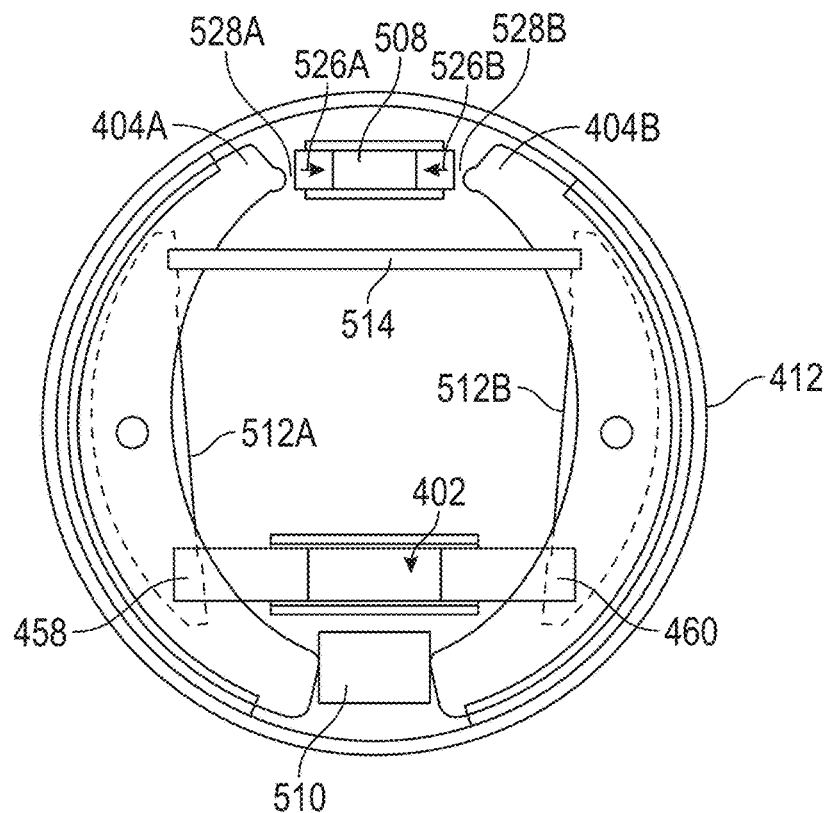
FIG. 25 is a schematic elevation view of the third drum brake assembly of FIG. 19 in a third state of operation.

Referring now to FIG. 25, the hydraulic wheel cylinder 508 is released, indicated by arrows 526A and 526B, immediately after the electric actuator assembly 402 was applied in FIG. 24. The electric actuator assembly 402 remains applied in FIG. 25, although the electric motor 424 is preferably unpowered or otherwise deactivated. As a non-limiting example, the electric actuator assembly 402 may remain applied via self-arresting of the gear reduction 426. Third and fourth gaps 528A and 528B, respectively, are opened between the first and second brake shoe and lining assemblies 404A and 404B, respectively, and the hydraulic wheel cylinder 508. The third and fourth gaps 528A and 528B, respectively, are opened to avoid actuation of the electric actuator assembly 402 generating feedback on a hydraulic brake system (not shown) of which the drum brake assembly 400 is a part. For example, the third and fourth gaps 528A and 528B avoid "pushback" on a brake pedal through the hydraulic brake system when the electric actuator assembly 402 is actuated. The drum brake assembly 400 continues to operate in the leading-trailing mode.

Figure 26:
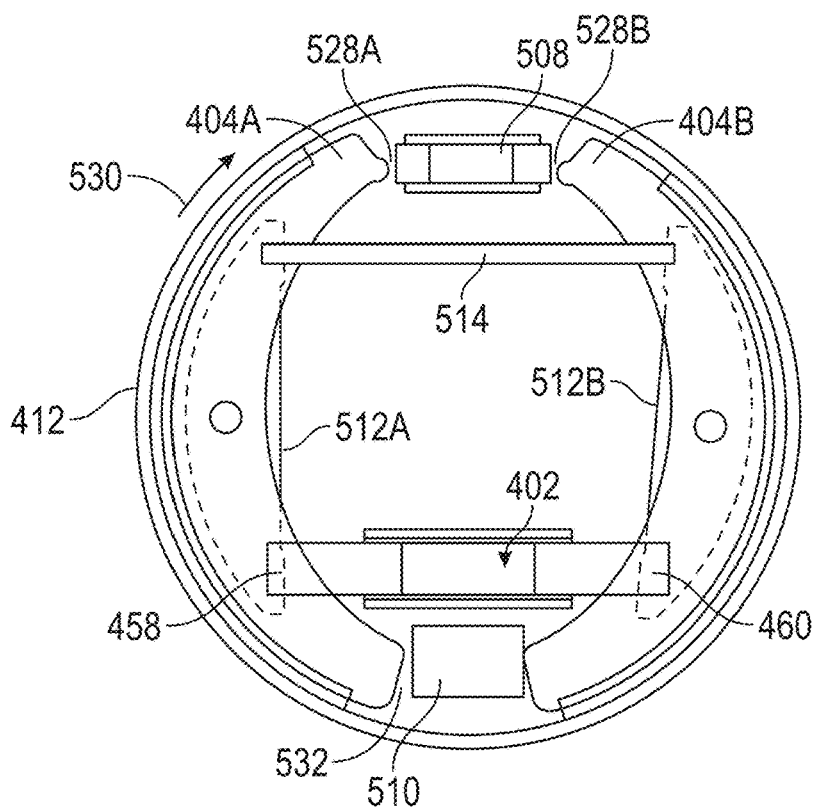
FIG. 26 is a schematic elevation view of the third drum brake assembly of FIG. 19 in a fourth state of operation.

Referring now to FIG. 26, the hydraulic wheel cylinder 508 remains released, the electric actuator assembly 402 remains applied, and the first brake shoe and lining assembly 404A has shifted because of rotation of the brake drum 412 in a direction 530. As such, the first brake shoe and lining assembly 404A becomes self-energizing. A fifth gap 532 has opened between the first brake shoe and lining assembly 404A and the shoe anchor 510. Alternatively, when the brake drum 412 rotates opposite the direction 530, the fifth gap 532 does not open, a corresponding gap (not shown) opens between the second brake shoe and lining assembly 404B and the shoe anchor 510, and the second brake shoe and lining assembly 404B becomes self-energizing. In FIG. 26, the drum brake assembly 400 is operating in a duo-servo mode.

Referring now to FIGS. 27-31, there is illustrated an electric actuator assembly, indicated generally at 602, for a drum brake assembly, indicated generally at 600 in FIG. 31. Because the drum brake assembly 600 and electric actuator assembly 602 are variations of the drum brake assembly 100 and electric actuator assembly 102, like reference numerals, increased by 500, designate corresponding parts in the drawings and detailed description thereof will be omitted, unless otherwise noted.

Figure 27:
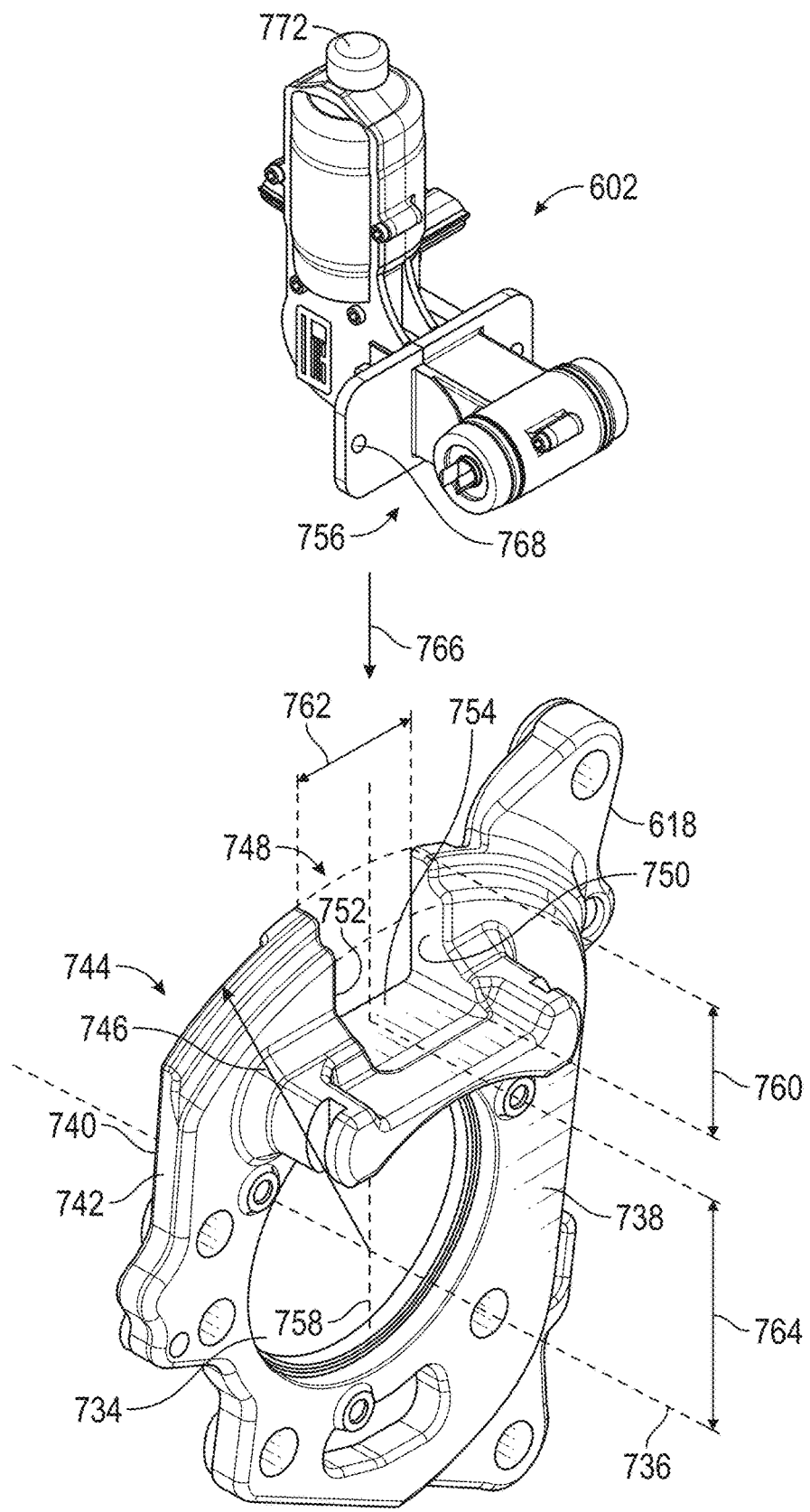
FIG. 27 is a perspective view of an electric actuator assembly in accordance with a fourth embodiment of the present invention.

Referring specifically to FIG. 27, there is illustrated the electric actuator assembly 602 and a drum-in-hat adapter 618. The drum-in-hat adapter 618 has an axle opening 734. The axle opening 734 is centered about an axle axis 736 of the drum-in-hat adapter 618 along which an axle case (not shown) extends. The drum-in-hat adapter 618 extends in a major direction outward from the axle axis 736 in a plane that is perpendicular to the axle axis 736.

The drum-in-hat adapter 618 has first and second faces 738 and 740, respectively. The first and second faces 738 and 740, respectively, are substantially parallel to each other and perpendicular to the axle axis 736. As such, the first and second faces 738 and 740, respectively, are also substantially parallel to the plane in which the drum-in-hat adapter 618 extends from the axle axis 736.

A side surface 742 spans between the first and second faces 738 and 740, respectively. The side surface 742 extends in a minor direction generally parallel to the axle axis 736. As illustrated, the side surface 742 need not be planar. An arcuate portion, indicated generally at 744, of the side surface 742 has a radius 746 from the axle axis 736. Alternatively, the arcuate portion 744 may have a shape other than the arcuate shape illustrated.

The drum-in-hat adapter 618 further has a cradle portion, indicated generally at 748, defined in the arcuate portion 744. Alternatively, the cradle portion 748 may be defined in the side surface 742 other than in the arcuate portion 744. A continuation of an arc defined by the arcuate portion 744 across the cradle portion 748 is shown by dashed lines. The arcuate portion 744 is interrupted or otherwise disrupted by the cradle portion 748. As such, the cradle portion 748 extends into the drum-in-hat adapter 618 from all of the first face 738, second face 740, and side surface 742 and not only from the first and second faces 738 and 740, respectively.

The cradle portion 748 has first and second cradle side surfaces 750 and 752, respectively, and a bottom surface 754 spanning between the first and second cradle side surfaces 750 and 752, respectively. The cradle portion 748 has a generally U-shape along the axle axis 736. Alternatively, the cradle portion 748 may have a shape other than the U-shape illustrated. As non-limiting examples, the cradle portion 748 may have a semicircular or triangular shapes. Preferably, the cradle portion 748 and a contact portion, indicated generally at 756, of the electric actuator assembly 602 have complementary shapes.

Preferably the bottom surface 754 is perpendicular to an insertion axis 758 of the drum-in-hat adapter 618. Preferably the first and second cradle side surfaces 750 and 752, respectively, are parallel to each other and the insertion axis 758. The insertion axis 758 is perpendicular to the axle axis 736 and also in the plane in which the drum-in-hat adapter 618 extends outwardly from the axle axis 736. As illustrated, the cradle portion 748 is symmetric across the insertion axis 758 although such is not necessary.

At the first and second cradle side surfaces 750 and 752, respectively, the cradle portion 748 has a depth 760 along the insertion axis 758 and a width 762 perpendicular to the axle axis 736 and insertion axis 758. Also, the bottom surface is a distance 764 along the insertion axis 758 from the axle axis 736. The distance 764 is less than the radius 746.

The electric actuator assembly 602 is installed on the drum-in-hat adapter 618 by inserting the electric actuator assembly 602 in the cradle portion 748. The electric actuator assembly 602 is inserted in the cradle portion 748 by a radially inward motion 766 towards the axle axis 736 or other movement along the insertion axis 758. Preferably, the motion 766 along the insertion axis 758 is the only motion for inserting the electric actuator assembly 602 in the cradle portion 748. Alternatively, the motion 766 along the insertion axis 758 may be an initial or primary movement with minor, secondary additional adjustment in directions other than along the insertion axis 758. As a non-limiting example, the additional adjustment may be along the axle axis 736. The additional adjustment occurs after the electric actuator assembly 602 is inserted in the cradle portion 748 by the motion 766 along the insertion axis 758. The primary motion 766 is significantly greater than any secondary additional adjustment. The cradle portion 748 is not inserted in the cradle portion 748 by an initial or primary motion along the axle axis 736.

When inserted in the cradle portion 748, mounting flanges 668 bear on, or otherwise contact, the second face 740. The electric actuator assembly 602 is then preferably mounted or otherwise secured to the drum-in-hat adapter 618 by bolts extending through mounting holes 768 and screwed into corresponding threaded bores (not shown) in the second face 740.

Figure 28:
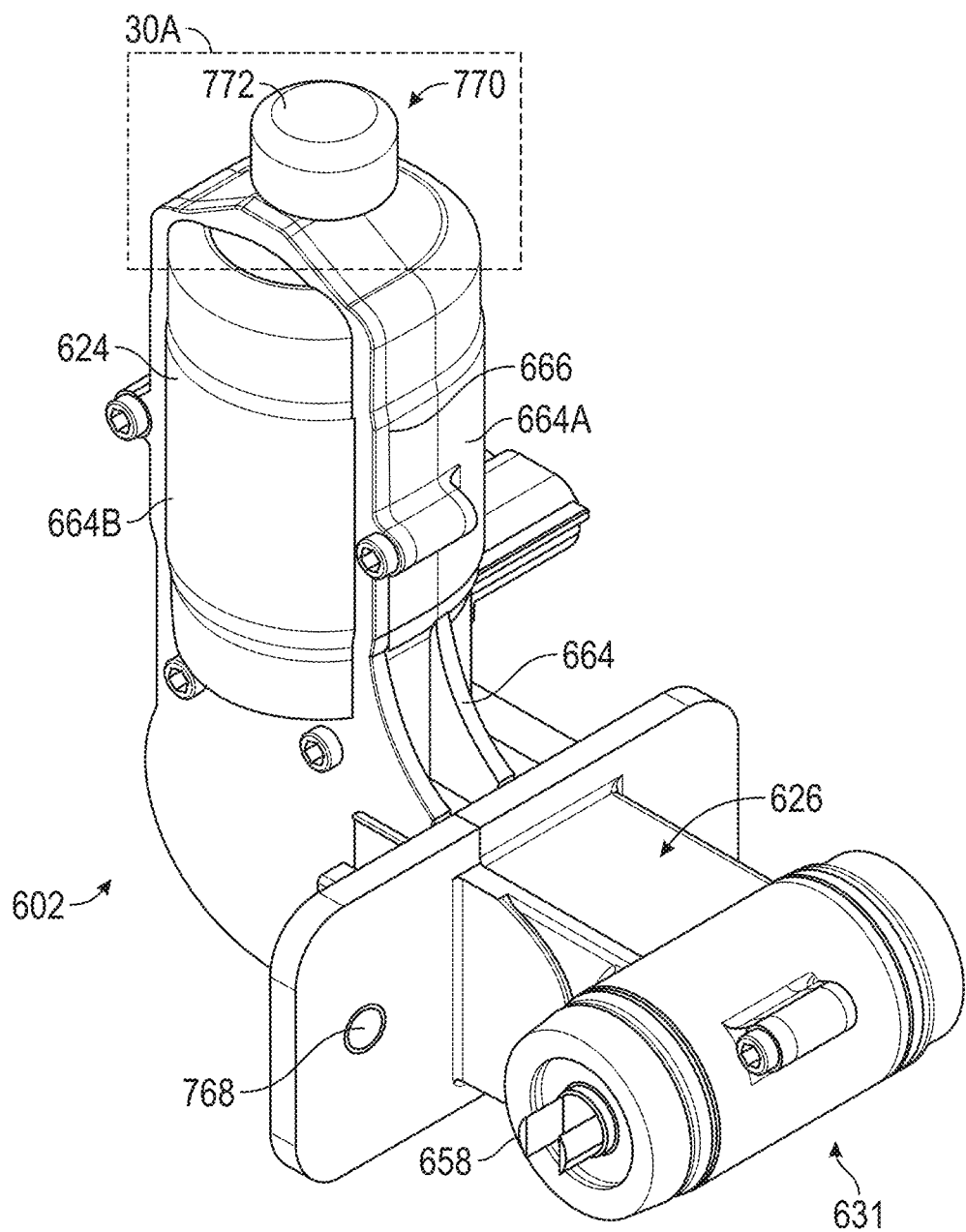
FIG. 28 is a second perspective view of the electric actuator assembly of FIG. 27.
Figure 29:
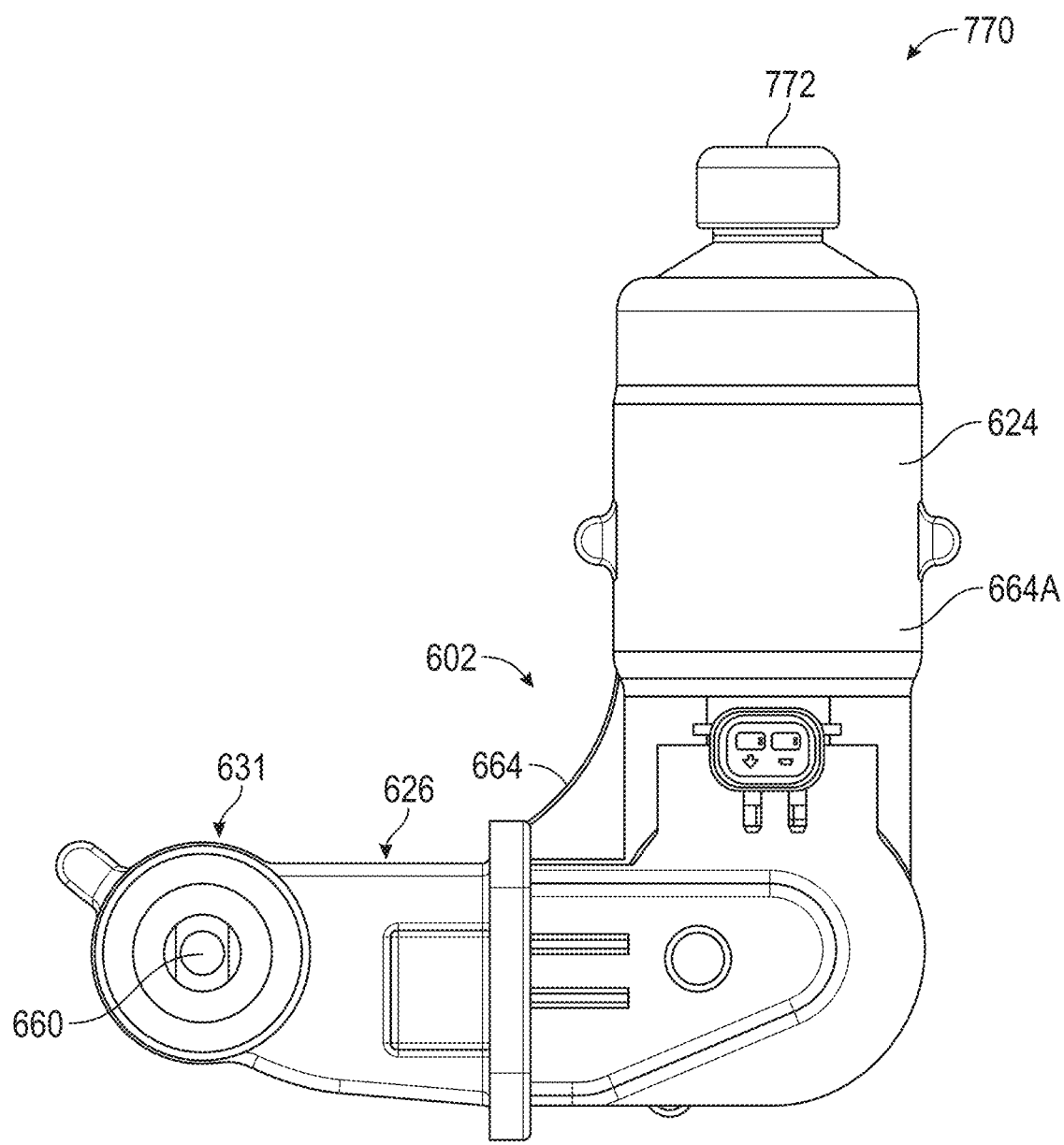
FIG. 29 is an elevation view of the electric actuator assembly of FIG. 27.

Referring now specifically to FIGS. 28 and 29, the electric actuator assembly 602 is illustrated in detail. The electric actuator assembly 602 has a port, indicated generally at 770, for connecting an external drive (not shown). As non-limiting examples, the external drive may be a manually operated crank or an electric motor. The port 770 allows a manual actuation of the drum brake assembly 600. As a non-limiting example, the port 770 may be used for an emergency release of the drum brake assembly 600.

Figure 30A:
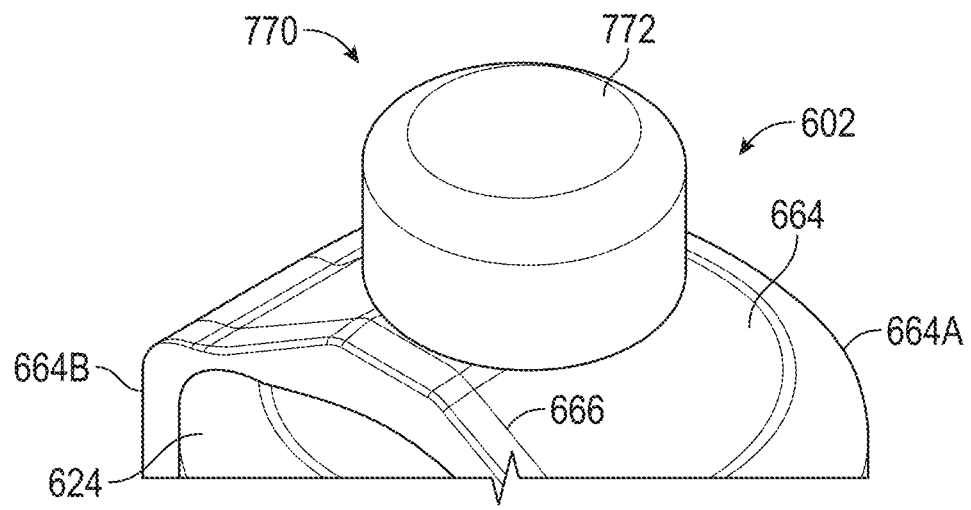
FIGS. 30A-30C are an enlarged portion of FIG. 28.
Figure 30B:
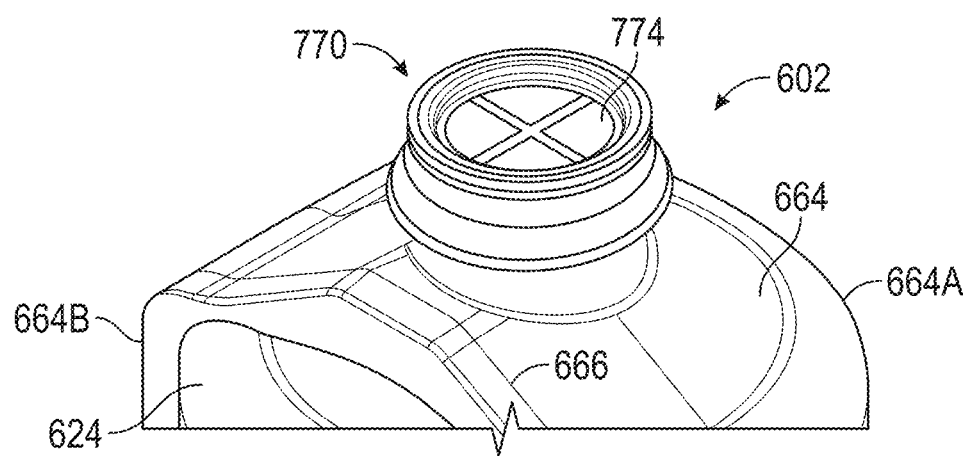
Figure 30C:
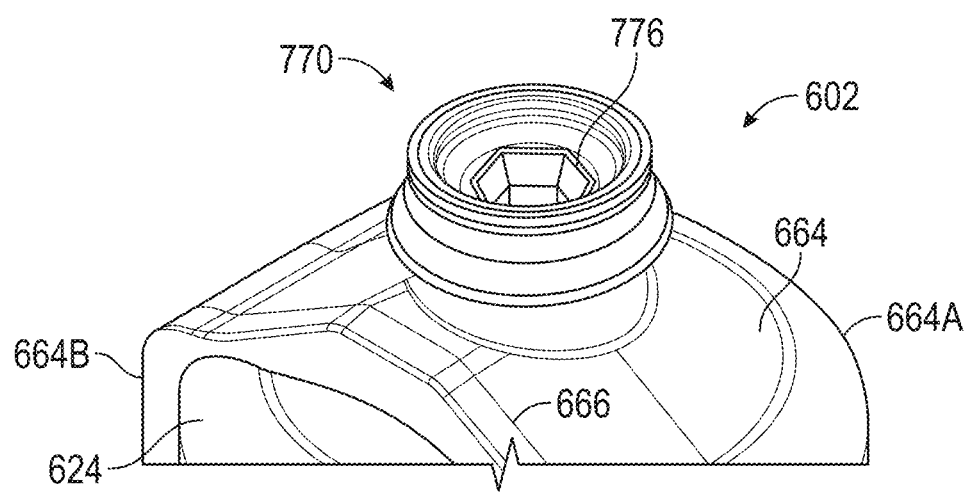

A non-limiting example of the port 770 is shown in FIGS. 30A-30C. In FIG. 30A, an outer cap 772 covers the port 770. Preferably, the outer cap 772 is produced from a rigid material such as a plastic or metallic material. In FIG. 30B, with the outer cap 772 removed, an inner seal 774 further covers the outer port 770. The inner seal 774 is protected under the outer cap 772. As a non-limiting example, the inner seal 774 may be a foil seal. In FIG. 30C, a drive socket 776 is under the inner seal 774. The drive socket 776 receives torque from the external drive. Thus, the external drive actuates the drum brake assembly 600 via the drive socket 776.

Referring now specifically to FIG. 31, there is illustrated the electric actuator assembly 602 installed on a steerable wheel (not shown). The associated structure of the steerable wheel is known to those skilled in the art. As such, only those portions of the associated structure of the steerable wheel that are necessary for a full understanding will be explained and illustrated in detail.

Shown in FIG. 31 is the drum-in-hat adapter 618. The electric actuator assembly 602 has been installed on the drum-in-hat adapter 618 along the insertion axis 758. Further shown is a brake drum 612 having a rotor disc 778, a hub 780, and a shaft or axle yoke 782 for a universal (UV) joint. The hub 780 is mounted on the shaft yoke 782. The hub 780 is held against the drum-in-hat adapter 602 by a hub and flange unit, indicated generally at 784. Wheel bolts or studs 786 extend from the hub 780.

Also shown in FIG. 31 are a steering linkage 788, a ball joint 790, and a steering knuckle 792. Movement of the steering linkage 788 effects movement of the steering knuckle 792 through the ball joint 790. This movement in turn steers the wheel. By installing the electric actuator assembly 602 along the insertion axis 758, the electric actuator assembly 602 has installation or other access clearance from the steering linkage 788, ball joint 790, and steering knuckle 792. Furthermore, positions of an electric motor (not shown) and bevel gear (not shown) within the electric actuator assembly 602 may be moved or otherwise adjusted in a direction 794 along the insertion axis 758 and away from the shaft yoke 782. By doing so, a clearance, indicated generally at 796, is defined between the electric actuator assembly 602 and the shaft yoke 782. The positions of the electric motor and bevel gear within the electric actuator assembly 602 may be adjusted as needed to adjust the clearance 796.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. An electric actuator assembly for a drum brake assembly, the electric actuator assembly comprising:
   an electric motor with an output shaft;
   a gear reduction, wherein the output shaft drives the gear reduction through a suitable gear type that is configured to convert a rotation torque of the output shaft to the gear reduction at a right angle;
   a linear translation assembly having a gear nut driven by the gear reduction and a rotationally fixed spindle, wherein the gear nut and the spindle linearly translate in opposite directions when the gear nut is driven;
   a connection portion of the linear translation assembly that is configured to actuate a brake shoe and lining assembly of the drum brake assembly;
   a spring pack between the gear nut and the connection portion, wherein the spring pack is configured to take up slack in the linear translation assembly;
   a bearing between the spindle and the spring pack; and
   a boot at the connection portion.

2. The electric actuator assembly of claim 1 further comprising:
   a first axis along which the output shaft extends; and
   a second axis along which the linear translation assembly translates, wherein the first axis and the second axis are perpendicular.

3. The electric actuator assembly of claim 1 further comprising:
   at least one pin, wherein the gear reduction is rotationally supported by the at least one pin; and
   an axis along which the output shaft extends, wherein the at least one pin and the axis are perpendicular.

4. The electric actuator assembly of claim 1 further comprising:
   at least one pin, wherein the gear reduction is rotationally supported by the at least one pin; and
   an axis along which the linear translation assembly translates, wherein the at least one pin and the axis are parallel.

5. The electric actuator assembly of claim 1 wherein the gear reduction comprises spur or helical gears.

6. The drum brake assembly of claim 1 wherein the suitable gear type is a bevel gear, a spiral bevel gear, a crown gear, a hypoid gear, or any other type of gear with intersecting shafts, or a type of gear with non-intersecting shafts other than a worm gear.

7. The electric actuator assembly of claim 1 further comprising:
   a rotationally fixed spindle of the linear translation assembly, wherein the gear nut and the spindle linearly translate in opposite directions when the gear nut is driven.

8. The electric actuator assembly of claim 1 further comprising:
   an additional connection portion of the linear translation assembly that is adapted to actuate an additional brake shoe and lining assembly of the drum brake assembly.

9. The electric actuator assembly of claim 8 wherein the connection portion linearly translates in a first direction and the additional connection portion linearly translates in a second direction that is opposite the first direction.

10. The electric actuator assembly of claim 1 wherein the electric actuator assembly is interchangeable between a left hand drum brake assembly and a right hand drum brake assembly.

11. The electric actuator assembly of claim 1 wherein a first diameter of the gear reduction is less than or equal to a second diameter of the gear nut.

12. The electric actuator assembly of claim 1 wherein the electric actuator assembly is not configured to function as a shoe anchor for the brake shoe and lining assembly of the drum brake assembly.

13. The electric actuator assembly of claim 12 wherein the electric actuator assembly and the shoe anchor are configured as separate and distinct components.

14. The electric actuator assembly of claim 1 further comprising:
a drive socket configured for an external drive to actuate the brake shoe and lining assembly of the drum brake assembly.

15. The electric actuator assembly of claim 1 wherein the spindle, spring pack, bearing, and boot are directly supported by a housing of the electric actuator assembly and not configured to be directly supported by a drum-in-hat adapter.

16. A drum brake assembly comprising:
a brake drum;
a brake shoe and lining assembly operably displaceable to contact the brake drum; and
an electric actuator assembly having
an electric motor with an output shaft,
a gear reduction, wherein the output shaft drives the gear reduction through a suitable gear type that is configured to convert a rotation torque of the output shaft to the gear reduction at a right angle,
a linear translation assembly having a gear nut driven by the gear reduction and a rotationally fixed spindle, wherein
t he gear nut and the spindle linearly translate in opposite directions when the gear nut is driven,
a connection portion of the linear translation assembly that actuates the brake shoe and lining assembly to contact the brake drum,
a spring pack between the gear nut and the connection portion, wherein the spring pack is configured to take up slack in the linear translation assembly;
a bearing between the spindle and the spring pack; and
a boot at the connection portion.

17. The drum brake assembly of claim 16 wherein the gear reduction comprises spur or helical gears.

18. The drum brake assembly of claim 16 further comprising:
an additional brake shoe and lining assembly operably displaceable to contact the brake drum; and
an additional connection portion of the linear translation assembly that actuates the additional brake shoe and lining assembly to contact the brake drum.

19. The drum brake assembly of claim 16 further comprising:
a mounting flange of the electric actuator assembly;
a drum-in-hat adapter to which the mounting flange is mounted;
an opening through the drum-in-hat adapter; and
a pocket portion of the opening, wherein the electric actuator is configured to
(a) move vertically in a first direction such that the linear translation assembly enters the opening and the connection portion vertically aligns with the pocket portion,
(b) move horizontally in a second direction after the step (a) such that the connection portion passes through the pocket,
(c) move vertically in a third direction, opposite the first direction, after the step (b), and
(d) move horizontally in the second direction, after the step (c), until the linear translation assembly passes through the opening and the mounting flange is positioned for mounting to the drum-in-hat adapter.

20. The drum brake assembly of claim 16 wherein the electric actuator assembly is not configured to function as a shoe anchor for the brake shoe and lining assembly of the drum brake assembly.

21. The electric actuator assembly of claim 20 wherein the electric actuator assembly and the shoe anchor are configured as separate and distinct components.

22. The drum brake assembly of claim 16 further comprising:
a drive socket of the electric actuator assembly, wherein the drive socket is configured for an external drive to actuate the brake shoe and lining assembly of the drum brake assembly.

23. The electric actuator assembly of claim 16 wherein the spindle, spring pack, bearing, and boot are directly supported by a housing of the electric actuator assembly and not configured to be directly supported by a drum-in-hat adapter.

24. A drum brake assembly comprising:
a brake drum;
a brake shoe and lining assembly operably displaceable to contact the brake drum;
a hydraulic wheel cylinder adapted to displace the brake shoe and lining assembly;
a shoe anchor;
a strut;
an electric actuator assembly;
a mounting flange of the electric actuator assembly;
a drum-in-hat adapter to which the mounting flange is mounted; and
a cradle portion of the drum-in-hat adapter, wherein the electric actuator assembly is configured to be installed in the cradle portion by movement along an insertion axis of the drum-in-hat adapter that is perpendicular to an axle axis of the drum-in-hat adapter; and
a lever operably positioned between the electric actuator assembly and the brake shoe and lining assembly, wherein the drum brake assembly is configured to
(a) actuate the hydraulic wheel cylinder to displace the brake shoe and lining assembly against the shoe anchor when the electric actuator assembly is unactuated,
(b) actuate the electric actuator assembly, while the hydraulic wheel cylinder is actuated by the step (a), to displace the lever against the strut and against the brake shoe and lining assembly, wherein the displaced lever clamps the brake shoe and lining assembly against the brake drum, and
(c) release the hydraulic wheel cylinder immediately after the electric actuator assembly is actuated in the step (b).

25. The drum brake assembly of claim 24 further comprising:
an additional brake shoe and lining assembly; and
an additional lever, wherein the additional brake shoe and lining assembly is displaced against the shoe anchor by the hydraulic wheel cylinder in the step (a), the additional lever is displaced against the strut and against the additional brake shoe and lining assembly in the step (b), and in the step (b) the displaced additional lever clamps the additional brake shoe and lining assembly against the brake drum.

26. The drum brake assembly of claim 24 wherein the electric actuator assembly is the shoe anchor.

27. The drum brake assembly of claim 24 wherein the electric actuator assembly further comprises:
an electric motor with an output shaft extending along a first axis;
a gear reduction, wherein the output shaft drives the gear reduction through a suitable gear type that can convert a rotation torque of the output shaft to the gear reduction at a right angle;
a linear translation assembly having a gear nut driven by the gear reduction, wherein the linear translation assembly linearly translates along a second axis when the gear nut is driven and the first axis and the second axis are perpendicular; and
a connection portion of the linear translation assembly that actuates the brake shoe and lining assembly.

28. The drum brake assembly of claim 27 further comprising:
a rotationally fixed spindle of the linear translation assembly, wherein the gear nut and the spindle linearly translate in opposite directions when the gear nut is driven;
a spring pack between the gear nut and the connection portion, wherein the spring pack is configured to take up slack in the linear translation assembly;
a bearing between the spindle and the spring pack; and. a boot at the connection portion.

29. The electric actuator assembly of claim 28 wherein the spindle, spring pack, bearing, and boot are directly supported by a housing of the electric actuator assembly and not configured to be directly supported by a drum-in-hat adapter.

30. The drum brake assembly of claim 24 wherein the electric actuator assembly further comprises:
an electric motor with an output shaft extending along a first axis and driving a gear reduction;
a linear translation assembly having a gear nut driven by the gear reduction, wherein the linear translation assembly linearly translates along a second axis when the gear nut is driven and the first axis and the second axis are parallel; and
a connection portion of the linear translation assembly that actuates the brake shoe and lining assembly.

31. The drum brake assembly of claim 24 wherein the electric actuator assembly is not configured to function as a shoe anchor for the brake shoe and lining assembly of the drum brake assembly.

32. The electric actuator assembly of claim 31 wherein the electric actuator assembly and the shoe anchor are configured as separate and distinct components.

33. The drum brake assembly of claim 24 further comprising:
a drive socket of the electric actuator assembly, wherein the drive socket is configured for an external drive to actuate the brake shoe and lining assembly of the drum brake assembly.

34. An electric actuator assembly for a drum brake assembly, the electric actuator assembly comprising:
an electric motor with an output shaft;
a gear reduction, wherein the output shaft drives the gear reduction through a suitable gear type that is configured to convert a rotation torque of the output shaft to the gear reduction at a right angle;
a linear translation assembly having a gear nut driven by the gear reduction wherein the linear translation assembly linearly translates when the gear nut is driven; and
a connection portion of the linear translation assembly that is configured to actuate a brake shoe and lining assembly of the drum brake assembly, wherein the electric actuator assembly is configured to be installed in a cradle portion of a drum-in-hat adapter by movement along an insertion axis of the drum-in-hat adapter that is perpendicular to an axle axis of the drum-in-hat adapter.

35. A drum brake assembly of claim comprising:
a brake drum;
a brake shoe and lining assembly operably displaceable to contact the brake drum; and
an electric actuator assembly having
an electric motor with an output shaft,
a gear reduction, wherein the output shaft drives the gear reduction through a suitable gear type that is configured to convert a rotation torque of the output shaft to the gear reduction at a right angle,
a linear translation assembly having a gear nut driven by the gear reduction, wherein the linear translation assembly linearly translates when the gear nut is driven,
a connection portion of the linear translation assembly that actuates the brake shoe and lining assembly to contact the brake drum,
a mounting flange of the electric actuator assembly;
a drum-in-hat adapter to which the mounting flange is mounted; and
cradle portion of the drum-in-hat adapter, wherein the electric actuator assembly is configured to be installed in the cradle portion by movement along an insertion axis of the drum-in-hat adapter that is perpendicular to an axle axis of the drum-in-hat adapter.

* * * * *